(12) United States Patent
Zhang et al.

(10) Patent No.: US 10,539,991 B2
(45) Date of Patent: *Jan. 21, 2020

(54) NETWORK DEVICES WITH MULTI-LEVEL ELECTRICAL ISOLATION

(71) Applicant: ANEWCOM, Inc., Dublin, CA (US)

(72) Inventors: Qin Zhang, San Jose, CA (US);
Gongen Gu, Zephyr Cove, NV (US);
Calvin Xu, Dublin, CA (US)

(73) Assignee: ANEWCOM, Inc., Dublin, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/947,062

(22) Filed: Apr. 6, 2018

(65) Prior Publication Data

US 2018/0232027 A1    Aug. 16, 2018

Related U.S. Application Data

(63) Continuation of application No. PCT/US2017/064008, filed on Nov. 30, 2017, which
(Continued)

(51) Int. Cl.
*G06F 1/26* (2006.01)
*H04L 12/10* (2006.01)

(52) U.S. Cl.
CPC ............. *G06F 1/266* (2013.01); *G06F 1/26* (2013.01); *G06F 1/263* (2013.01); *H04L 12/10* (2013.01)

(58) Field of Classification Search
CPC . H02H 9/04; H02H 9/06; H01R 24/48; G06F 1/266; G06F 1/26; G06F 1/263; H04L 12/10; H04L 45/60; H04L 12/04
(Continued)

(56) References Cited

U.S. PATENT DOCUMENTS 6,714,558 B1    3/2004  Patel et al.
7,200,176 B1    4/2007  Paulos et al.
(Continued)

FOREIGN PATENT DOCUMENTS

CN    201270088 Y    7/2009
CN    203014492 U    6/2013
WO    2003077456     9/2003

OTHER PUBLICATIONS

Neuhaus, R., A Beginner's Guide to Ethernet 802.3, Engineer-to-Engineer Note, Jun. 6, 2005, 1-26, EE-269.
(Continued)

*Primary Examiner* — Dharti H Patel
(74) *Attorney, Agent, or Firm* — Perkins Coie LLP

(57) ABSTRACT

A network apparatus architecture is disclosed that includes one or more isolation circuits to accommodate a predetermined isolation voltage. Each isolation circuit enables an independent DC voltage to be selected along a network signaling path to accommodate different DC voltages of network circuits along the network signaling path. For example, DC isolation may be provided between a physical interface and a network circuit via one or more capacitors, optoelectronic isolators, coupled magnetic devices, or semiconductor devices. A network circuit may be powered by a power supply that is isolated from the rest of the network apparatus. The one or more isolation circuits and network circuits may be included in a system-on-chip, or application-specific integrated circuit.

16 Claims, 20 Drawing Sheets

Related U.S. Application Data is a continuation of application No. 15/640,366, filed on Jun. 30, 2017, now Pat. No. 9,851,770.

(60) Provisional application No. 62/488,664, filed on Apr. 21, 2017, provisional application No. 62/447,237, filed on Jan. 17, 2017, provisional application No. 62/446,707, filed on Jan. 16, 2017, provisional application No. 62/443,802, filed on Jan. 8, 2017.

(58) Field of Classification Search
USPC .......................................................... 361/119
See application file for complete search history.

(56) References Cited

U.S. PATENT DOCUMENTS

| | | | |
|---|---|---|---|
| 7,276,814 B2 | 10/2007 | Pozzuoli et al. | |
| 7,276,914 B2 * | 10/2007 | Li | G01N 23/046 |
| | | | 324/527 |
| 7,409,566 B1 | 8/2008 | Diab | |
| 7,701,092 B1 | 4/2010 | Parker et al. | |
| 8,095,710 B2 | 1/2012 | Landry et al. | |
| 8,132,027 B2 | 3/2012 | Blaha et al. | |
| 8,358,492 B2 | 1/2013 | Wiese et al. | |
| 9,851,770 B1 * | 12/2017 | Zhang | G06F 1/26 |
| 2007/0208961 A1 | 9/2007 | Ghoshal et al. | |
| 2008/0181316 A1 | 7/2008 | Crawley et al. | |
| 2008/0267212 A1 | 10/2008 | Crawley et al. | |
| 2009/0213914 A1 | 8/2009 | Dong et al. | |
| 2015/0002057 A1 | 1/2015 | Kawamura et al. | |

OTHER PUBLICATIONS

Capacitive Coupling Ethernet Transceivers without Using Transformers, Micrel 10/100 Ethernet Products, Jun. 2009, Application Note 120.

Catalyst 3750 Switch Hardware Installation Guide, Cisco Systems, Inc., Oct. 2011.

88E3015/88E3018: Integrated 10/100 Fast Ethernet Transceiver, Marvell, Jan. 4, Rev. D.

Power Over Ethernet Info Sheet: The ABCs of Power Over Ethernet, Contemporary Controls, Jan. 2006.

Unterdorfer, P., Power over Ethernet: IEEE 802.3af, Hirschmann Automation and Control GmbH, Jun. 30, 2008, 1-10.

IEEE 802.3af Power Interface Switch for Power Over Ethernet (PoE) Powered Devices, Texas Instruments, Aug. 2002, Revised Mar. 2004, SLUS537C.

AN-1519 DP83848 PHYTER Transformerless Ethernet Operation, Texas Instruments Application Report, Oct. 2006, Revised Apr. 2013, SNLA088A.

Yarmarkov, A., TLK110 Ethernet PHY Transformerless Operation, Texas Instruments Application Report, Sep. 2001, SLLA327.

International Search Report and Written Opinion for Application No. PCT/US2017/064008, dated Mar. 19, 2018 (16 pages).

Office Action dated Mar. 4, 2019 in Chinese Patent Application No. 201810016608.1, 13 pages.

\* cited by examiner

NETWORK DEVICES WITH MULTI-LEVEL ELECTRICAL ISOLATION

CROSS REFERENCE TO RELATED APPLICATIONS

This patent document is a continuation application of, and claims the priority and benefits of, Patent Cooperation Treaty (PCT) Application No. PCT/US2017/064008, entitled "NETWORK DEVICES WITH MULTI-LEVEL ELECTRICAL ISOLATION", and filed on Nov. 30, 2017, which further claims the benefit of U.S. Provisional Patent Application No. 62/443,802, filed Jan. 8, 2017, entitled "TRANSFORMER-LESS NETWORK DEVICES"; U.S. Provisional Patent Application No. 62/446,707, filed Jan. 16, 2017, entitled "SYSTEM ON A CHIP FOR TRANSFORMER-LESS NETWORK DEVICES"; U.S. Provisional Patent Application No. 62/447,237, filed Jan. 17, 2017, entitled "POWER OVER ETHERNET FOR TRANSFORMER-LESS NETWORK DEVICES"; U.S. Provisional Patent Application No. 62/488,664, filed Apr. 21, 2017, entitled "NETWORK DEVICES WITH MULTI-LEVEL ELECTRICAL ISOLATION"; and U.S. Non-Provisional patent application Ser. No. 15/640,366, filed Jun. 30, 2017, entitled "NETWORK DEVICES WITH MULTI-LEVEL ELECTRICAL ISOLATION," now U.S. Pat. No. 9,851,770. This patent document further claims, via the Patent Cooperation Treaty (PCT) Application No. PCT/US2017/064008, the priorities of all of the above listed patent applications. The contents of the before-mentioned patent applications are hereby incorporated by reference in their entirety into the instant application.

TECHNICAL FIELD

The present disclosure relates to network routers and switches, including router and switch devices in Ethernet applications, and systems and methods of providing electrical isolation.

BACKGROUND

Network routers and switches are used to provide network connections in various modern computing environments. Network switches may connect computers within a network and network routers may connect multiple networks together. Networked computers are often spatially separated, e.g., tens of meters to one hundred meters or more apart in some deployments, and generally computers separated by several meters or more tend to operate using different power supplies. The system of network devices requires different isolations to support various applications, e.g., different power supplies of different computers provide a prescribed operating voltage for each computer but the power supplies of the different computers may be at different absolute potentials (DC voltages). As a result, network interfaces may not provide direct current (DC) connections between computers. Moreover, noise and spikes may be introduced onto the network wiring creating the potential for damage when networked computers are DC connected. For these and other reasons, some routers, switches, and computers, may be electrically isolated from other network devices connected to a network. In various applications, inexpensive, reliable, and space-efficient isolation devices, circuits, and systems are needed.

SUMMARY

The disclosed technology can be used to provide a system using multiple levels of isolation provided by multiple isolation devices or circuits within a network device or between network devices. A multi-level isolation device or circuit may include separate or discrete isolation components that are connected in series to allow a high voltage isolation over the entirety of the serially connected isolation components while having a lower isolation voltage at each isolation component. Each isolation component may include a capacitor, an optoelectronic isolation device, a coupled magnetic device, or a semiconductor device. On one side, the multi-level isolation can provide DC voltage, or common mode voltage filtering, or EMI, or the combination of multiple types of isolation within the system to allow the input side of the isolation to have a DC voltage, or common mode voltage, or EMI that is different from an output side of the isolation. On the other side, for a particular type of the isolation, each isolation device or circuit enables multiple separated components to achieve the desired overall isolation requirements. In the example of DC isolation, the difference in DC voltage can be a suitable amount below a breakdown voltage of the isolation circuit. This enables determination of a DC voltage at one side of the isolation circuit independent of the DC voltage at the other side of the isolation circuit. This can be advantageous in designing certain high speed networking systems where a serial connection can reach a relatively high speed, e.g., 10 Gb/s and beyond, and the circuit board (PCB) for such a serial connection can exhibit undesirably high transmission loss.

The disclosed multi-level isolation can be implemented to enable the serial connection with a suitable high speed while a reduced transmission loss by using electrical jumper wires with multi-level isolation circuits located at the either side of the wires and/or as a part of the wire itself. Also, using at least one or multiple capacitors, optoelectronic isolation devices, coupled magnetic devices, semiconductor devices or the combination of various isolation technologies allows the system to be manufactured at a lower cost and compact size to enhance current Ethernet devices and to enable the high speed and high power next generation Ethernet devices. For example, a DC voltage at a network circuit connected to an output of an isolation circuit may be selected independently of a DC voltage at a physical interface connected to the input of an isolation circuit using a single system-on-chip solution. A system using multiple isolation circuits in a network device (e.g., switch, router, computer, etc.) enables separation of isolation functions and simplifies the component selection criteria, and lowers the systems cost. In addition, this use of multiple isolation circuits in a multi-level isolation configuration enables higher speeds and higher power network interfaces that would otherwise be restricted by the less precision and labor intensive single isolation magnetism components in some existing solutions. In some example embodiments of the disclosed multi-level isolation technology, network circuits between the isolation circuits may be powered by different power supplies. In some example embodiments, the combination of providing a first multi-level isolation circuit at a physical interface, and a second multi-level isolation circuit between a downstream network circuit and an upstream network circuit, and isolated power supplies, provides a low-cost, high-speed, small-sized network interface for computers, routers, and/or switches. Moreover, in some example embodiments, power over Ethernet may be provided using the same isolated power supply as provides power to a downstream network circuit. In some example embodiments, a multi-level isolation circuit for high-speed networking such as Ethernet may include multiple isolation circuits such as a high-speed isolation circuit, a lower speed-isolation circuit, and/or an isolation circuit for control signals. The different isolation circuits may use different components from each other in order to minimize cost and/or optimize the design such as minimizing the size of the multi-level isolation circuit.

In one aspect, an Ethernet communication apparatus is provided to include a physical interface that forms an input of the apparatus for receiving Ethernet signals and an output of the apparatus for outputting Ethernet signals; a physical layer circuit in communication with the physical interface to perform physical layer communication processing with respect to the transmitted or received Ethernet signals at the physical interface; a network processing circuit in communication with the physical layer circuit to perform network processing operations in connection with the transmitted or received Ethernet signals at the physical interface; and a multi-level isolation circuit coupled between the network processing circuit and the physical layer circuit to provide desired high voltage electrical isolation therebetween and structured to include separate isolation circuits electrically coupled in series to partition the desired first electrical isolation amongst the separate isolation circuits so that an isolation circuit is structured to provide only a part of the desired high voltage electrical isolation.

In some implementations, the apparatus can further include a first power supply and a power over Ethernet circuit coupled to and powered by the first power supply. The power over Ethernet circuit is coupled to the physical interface to supply electrical power to an Ethernet device connected via a network cable to the physical interface of the apparatus. A second power supply can be coupled to supply power to the network processing circuit and electrically isolated from the first power supply. The apparatus may also include a front end isolation circuit coupled between the physical layer circuit and the physical interface to provide electrical isolation therebetween where the front end isolation circuit may be a single level isolation circuit or a second multi-level isolation circuit. In some implementations multi-level isolation circuit may be structured to provide a high-speed isolation circuit for high speed serial signals, a low-speed isolation circuit for low-speed signals, and a control isolation circuit for control signals, wherein the high-speed serial signals, the low-speed signals, and the control signals are Ethernet related signals that pass between the physical layer circuit and the network processing circuit, and wherein the high-speed isolation, the low-speed isolation, and the control isolation circuits are different isolation circuits.

In one aspect, an apparatus includes a first isolation circuit structured to include a first input and a first output. The first isolation circuit may be structured to allow a first passed voltage at the first input to pass through the first isolation circuit to the first output. The first isolation circuit may be further structured to isolate a first isolated voltage at the first input from a second isolated voltage at the first output. The apparatus may further include a downstream network circuit structured to include a second input and a second output. The second input may be coupled to the first output of the first isolation circuit to receive the first passed voltage and the second isolated voltage. The downstream network circuit may be structured to process the first passed voltage to produce a second passed voltage and a third isolated voltage at the second output. The downstream network circuit may be operable to determine the second isolated voltage without regard to the first isolated voltage. The apparatus may further include a second isolation circuit structured to include a third input and a third output. The third input may be coupled to the second output of the downstream network circuit to receive the third isolated voltage and the second passed voltage. The second isolation circuit may be further structured to allow the second passed voltage to pass through the second isolation circuit to the third output. The second isolation circuit may be structured to isolate the third isolated voltage at the third input from a fourth isolated voltage at the third output. The apparatus may further include an upstream network circuit structured to include a fourth input and a fourth output. The fourth input may be coupled to the third output of the second isolation circuit to receive the second passed voltage and the fourth isolated voltage. The upstream network circuit may be structured to process the second passed voltage to produce digital data. The upstream network circuit may be operable to determine the fourth isolated voltage without regard to the third isolated voltage. The upstream network circuit may be powered by a first power supply isolated from a second power supply powering the downstream network circuit.

The apparatus may include any combination of the following features. The downstream network circuit may include a physical layer circuit, and the upstream network circuit may include a MAC layer circuit and a link layer circuit. The downstream network circuit may include a physical layer circuit and a MAC layer circuit, and the upstream network circuit may include a link layer circuit. At least one of the first isolation circuit and the second isolation circuit may include capacitors to provide isolation. At least one of the first isolation circuit and the second isolation circuit may include optoelectronic devices to provide isolation. At least one of the first isolation circuit and the second isolation circuit may include coupled magnetic devices to provide isolation. The first isolation circuit may provide 50 volts of isolation or more between the first input and the first output or between the second input and the second output. The first isolation circuit may provide 2000 volts of isolation or more between the first input and the first output or between the second input and the second output. The apparatus may provide communications in accordance with IEEE 802.3. The apparatus may further include a power over Ethernet circuit powered by the first power supply. The first power supply to PoE is the main power supply. The second power supply may be a DC-to-DC converter powered by the first power supply. The power over Ethernet circuit may supply power to an Ethernet device connected via a network cable to the apparatus. The apparatus may further include at least one autoformer with a centertap connected to the power over Ethernet circuit, wherein the autoformer enables power to be supplied to the Ethernet device.

In another aspect, a system-on-chip is disclosed. The system-on-chip may include a first isolation circuit at a first input from a first output, and/or a physical layer circuit to process the first output to produce a digital output. The apparatus may further include some levels of isolation from a second multi-level isolation circuit to isolate the digital output from a second input to an upstream network processing circuit. The second multi-level isolation circuit may provide a multi-level high-voltage isolation between the digital output and the second input. The upstream network processing circuit may be powered by a second power supply isolated from a first power supply powering the physical layer circuit. For example, the second power supply may be a DC-DC converter powered by the first power supply.

In another aspect, an Ethernet network apparatus includes a physical interface connected to a network cable, a system-on-chip, and network processing circuit with an associated second downstream interface and a second upstream interface. The system-on-chip may include a physical layer, and/or a first multi-level isolation circuit that includes a first downstream interface and a first upstream interface to provide multi-level isolation between the physical interface and the physical layer and network processing circuit. The first downstream interface may be connected to the physical interface and the first upstream interface is connected to the second downstream interface. The second upstream interface may be high-speed digital interfaces. The second network processing circuit may be powered by a second power supply isolated from a first power supply powering the physical layer and network processing circuits.

The following features may be included in any combination. The upstream network processing circuit may be a media access control circuit. The system-on-chip may further include a power over Ethernet circuit powered by the first power supply. The power over Ethernet circuit may supply power to an Ethernet device connected via a network cable to the apparatus. The apparatus may further include at least one autoformer with a centertap connected to the power over Ethernet circuit, wherein the autoformer enables power to be supplied to the Ethernet device. The first multi-level isolation circuit may include at least a capacitor with a breakdown voltage greater than or equal to 50 volts, or a combination of capacitors with a total breakdown voltage greater than or equal 50 volts. The second multi-level isolation circuit may include a capacitor with a breakdown voltage greater than or equal to 2000 volts or a combination of capacitors with a total breakdown voltages added to greater than or equal to 2000 volts. The first multi-level isolation circuit may isolate a DC voltage of the first input from the first output. The apparatus may provide communications in accordance with the IEEE 802.3 standard. The second multi-level isolation circuit may isolate a plurality of physical layer circuits from the media access control circuit. The apparatus may include a power over Ethernet circuit powered by the first power supply, wherein the second power supply is a DC-to-DC converter powered by the first power supply. The first power supply may include a DC-DC converter powered by the second power supply.

In another aspect, an apparatus may include a physical circuit structured to include a first input port and a first output port, the first input port structured to receive a first input signal, the physical layer circuit structured to process the first input signal to produce a first output signal at the first output port. The apparatus may further include an isolation circuit structured to include a second input port and a second output port. The second input port may be coupled to the first output port of the physical layer circuit to receive a first isolated voltage and a passed voltage, and may be structured to allow the passed voltage to pass through the second isolation circuit to the second output port. The isolation circuit may further be structured to isolate the first isolated voltage at the second input port from a second isolated voltage at the second output port. The apparatus may further include a media access control (MAC) circuit structured to include a third input port and a third output port. The third input port may be coupled to the second output port of the isolation circuit to receive the passed voltage and the second isolated voltage. The MAC circuit may be structured to process the passed voltage to produce digital data, wherein the MAC is operable to determine the second isolated voltage without regard to the first isolated voltage. The MAC circuit may be powered by a first power supply isolated from a second power supply powering the physical layer circuit. One or more of the first and second isolated voltages may be a DC voltage. The passed voltage may be an AC voltage.

The above and other aspects of the disclosed technology are described in greater detail in the drawings, the description and the claims.

BRIEF DESCRIPTION OF THE DRAWINGS

Where possible, like reference numbers refer to the same or similar features in the drawings.

DETAILED DESCRIPTION

Figure 1:
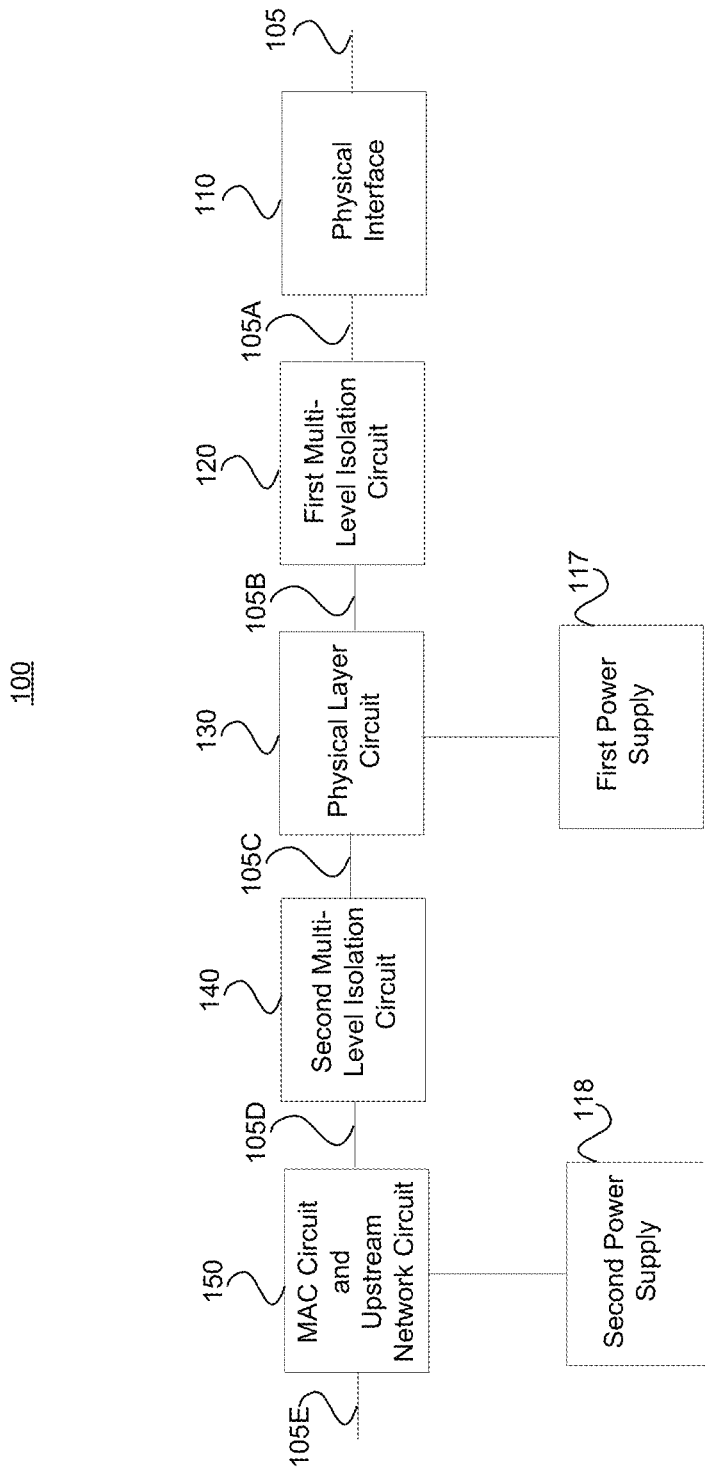
FIG. 1 depicts an example of a network apparatus, in accordance with some example embodiments.

A computing or communication device such as a computer may include one or more wired and/or wireless network apparatuses. The present disclosure is directed to wired network apparatuses and methods. For example, a device such as a computer may include a 10/100/1000/10000 Ethernet/Gigabit/10 Gigabit Ethernet network apparatus. Such a device may also include other network apparatuses that may use the disclosed subject matter. A switch and/or router may include multiple network apparatuses. For example, a network switch may include forty-eight ports, or any other number ports of 10/100/1000/10000 Ethernet/Gigabit/10 Gigabit Ethernet network apparatuses. The disclosed subject matter applies to each of the foregoing network apparatuses.

A network apparatus architecture is disclosed to include multiple levels of isolation. Each isolation removes some types of signals from an input and allows other signals to pass through the isolation to an output. For example in DC isolation, a multi-level isolation circuit may remove a direct current (DC) signal from an input and allow an alternating current (AC) signal to pass. Each of the multiple isolation circuits may provide isolation up to a maximum level of voltage or current. For example, an isolation circuit may provide DC isolation (removal of a DC voltage from an input signal) up to a predetermined voltage such as 50 volts, 100 volts, 2000 volts or any other predetermined value. Each isolation circuit may provide the same predetermined isolation or a different predetermined isolation value. For example, a dual isolation circuit network apparatus may include a first isolation circuit that provides 50 volts of DC isolation and the second isolation circuit may provide 2000 volts of isolation. Combined, the two isolation circuits as a whole may provide 2050 volts of DC isolation. Although the following description refers to isolation of DC voltages, the isolation provided by the disclosed isolation circuits may include isolation of but not limited to common mode voltage, electrostatic discharge (ESD), and/or electromagnetic interference (EMI).

Each isolation circuit is structured to allow the input side of an isolation circuit to have a DC voltage that is different from an output side of the isolation circuit. The difference in DC voltage can be any amount below a breakdown voltage of the isolation circuit. This enables at a design time of a network apparatus selection or determination of more appropriate components and spread out at more appropriate places on the isolation circuit. For example, a DC voltage at a network circuit connected to an output of an isolation circuit may be selected independently of a DC voltage at physical interface connected to the input of an isolation circuit. In this example, the DC voltage at the physical interface (and input side of the isolation circuit) may be selected or determined based on the DC voltage of a network apparatus at the other end of a connected network cable, and the DC voltage at the network circuit (output side of the isolation circuit) may be selected or determined by one or more circuits in the network circuit. An isolation circuit in a system can be a multi-level isolation circuit by partitioning the overall desired isolation function into discrete isolation components or sub circuits that are connected in series so that each isolation component is designed to provide a lower isolation voltage or current and to enable signal transmission through the serially connected discrete isolation components at a desired high speed. For example, a 2000 volt breakdown voltage can be split into two 1000 volt components where each is placed at the input of the second isolation circuit and at the output of the second isolation circuit. In this way, multi-level DC voltage isolation may be selected with each isolation circuit for the benefit of lower cost components and enhanced manufacturability.

In implementations, each multi-level isolation circuit may include a capacitor, a magnetic device, an optoelectronic device, and/or a semiconductor device. Providing the predetermined isolation may require selecting an isolation component to meet the predetermined isolation. For example, to provide 1000 volts of DC voltage isolation when a capacitor is selected as the isolation circuit, the capacitor breakdown voltage must be 1000 volts or more. To provide 1000 volts of DC voltage isolation when a magnetic device is selected as the isolation circuit, the magnetic device breakdown voltage must be 1000 volts or more. To provide 1000 volts of DC voltage isolation when an optoelectronic device is selected as the isolation circuit, the optoelectronic device breakdown voltage must be 1000 volts or more. To provide 1000 volts of DC voltage isolation when a semiconductor device is selected as the isolation circuit, the semiconductor device or circuit breakdown voltage may be 1000 volts or more. Each isolation circuit may also provide AC isolation of signals below a certain frequency or above a certain frequency. In high-speed networking implementations, a control signal and lower speed communication buses, and others which coexist with high-speed serial communication inside the Ethernet systems may be separately isolated using a different isolation arrangement to further minimize cost and size of the system design.

In some example embodiments, two circuits with an isolation circuit between them may allow for the DC voltages on each side of the isolation circuit to be different. For example, one side of an isolation circuit may be at one voltage (e.g., 10 volts) and the other side may have another voltage (e.g., 1.5 volts). Multi-level isolation circuits may allow for multiple DC voltage levels. In some example embodiments, when N is the number of isolation circuits, N+1 is the number of different DC voltages that may be accommodated in a series of isolation circuits. For example, in an isolation design that uses two isolation circuits in series, three isolation voltages may be present at the three different locations. The different isolation voltages may be independently selected to accommodate circuits before or after each isolation circuit. In this way, the isolation voltages between isolation circuits may be engineered to accommodate other circuits in the network processing path. Therefore, using multi-level isolation can provide flexibility and reduced cost while providing desired isolation and transmission speeds.

As described above, the isolation circuits may include capacitors, coupled magnetic devices, optoelectronic devices, and/or semiconductor devices. Without loss of generality, herein a capacitive isolation circuit is described but any other type of isolation circuit may be used instead of or in addition to a capacitive isolation circuit.

In some example embodiments, the network apparatus architecture provides low voltage DC isolation at a first multi-level isolation circuit and high-voltage isolation at a second multi-level isolation circuit. The disclosed technology provides, in some implementations, DC isolation of inputs and outputs at a physical interface such as a RJ-45 connector via a plurality of capacitors. The DC isolation capacitors may exhibit breakdown voltages, e.g., 50 volts or more in some DC isolation capacitors used in Ethernet switches consistent with the instant subject matter. Depending on the designs of network devices, different numbers of DC isolation capacitors may be used. For example, four, eight, or more DC isolation capacitors may be included in a network apparatus. The DC isolated signals are detected and processed by a physical layer circuit that may be powered by a power supply that is isolated from the rest of the network apparatus. The inputs and outputs of the physical layer circuit may be high-speed serial signals. These high-speed signals may be isolated with high-voltage isolation from a medium access control (MAC) layer circuit via a small number of high-breakdown voltage capacitors. The capacitance value of the high-breakdown voltage capacitors is chosen to be high enough in capacitance that the high breakdown voltage capacitors have a low impedance compared to input impedances of the physical layer circuit and the MAC layer circuit. Because the serial signals can be high-speed signals (e.g., 10 Gigabits per second), the capacitance value of the high-breakdown voltage capacitors may be lower than if the signals were lower in speed (e.g., 100 Megabits per second).

FIG. 1 depicts a network apparatus 100, in accordance with some example embodiments. Network apparatus 100 includes a physical interface 110 connected to a network cable 105, a first multi-level isolation circuit 120 (also referred to herein as first isolation circuit 120), physical layer circuit 130, a second multi-level isolation circuit 140 (also referred to herein as second isolation circuit 140), and MAC and upstream network circuit 150. Physical layer circuit 130 may be powered by a first power supply 117 and MAC and upstream network circuit 150 may be powered by a second power supply 118.

Physical interface 110 may include a single connector or a gang of connectors. For example, physical interface 110 may include a single RJ-45 connector. Physical interface 110 may provide connection from a network cable 105 containing two to four twisted pairs of wire for each connector to the network apparatus 100. In some example embodiments, four twisted pairs of wire in the network cable 105 may be connected to network adapter 100 via physical interface 110. For example, the network apparatus 100 may send data via physical interface 110 and through two of the twisted pairs in network cable 105, and network apparatus 100 may receive data via physical interface 110 through a second two twisted pairs in network cable 105. In some example embodiments, data may be sent and/or received via physical interface 110 using more than four twisted pairs in the network cable 105. For example, physical interface 110 may connect multiple connectors with four or more twisted pairs from cable 105 to network adapter 100. In some example embodiments, one or more pairs may send and receive in full-duplex. In the foregoing description, a pair of wires or twisted pair includes two wires. Twisted pairs may be driven differentially where the twisting may reduce cross-talk to other twisted pairs and reduce radiated emissions.

First isolation circuit 120 may provide voltage isolation between physical interface 110 and physical layer circuit 130. For example, network cable 105 may be connected to physical interface 110 at one end, and to another physical interface and network apparatus at the other end. The other end of network cable 105 may be connected to a network apparatus in a computer located 100 meters or some other distance away. The other network apparatus at the computer may drive the wires in network cable 105 to a non-zero DC potential due to variations in a ground potential or other causes. For example, both wires in a twisted pair may be at 50 volts DC compared to network apparatus 100. Continuing the previous example, without isolation, current may flow due to the difference in DC voltage between network apparatus 100 and the network apparatus at the computer located 100 meters away. In some example embodiments, first isolation circuit 120 may isolate physical layer circuit 130 from the other network apparatus at the distant computer. Isolation circuit 120 may include capacitors, coupled magnetic devices, optoelectronic devices, and/or semiconductor devices. First multi-level isolation circuit 120 may eliminate the DC voltage from one or more twisted pairs in network cable 105. First multi-level isolation circuit 120 may provide signals from network cable 105 to physical layer circuit 130 with the DC voltage removed. In some example embodiments, the first multi-level isolation circuit 120 provides DC isolation of a power over Ethernet (POE) voltage carried on two or four twisted pairs. The POE voltage may be a 50 volt signal. Data may be transmitted through each pair of wires as differential signals that are not blocked by first multi-level isolation circuit 120.

In some example embodiments, first multi-level isolation circuit 120 may include one or more optoelectronic isolation circuits. For example, physical layer circuit 130 may generate a transmit signal modulated to carry data to be transmitted on a twisted pair of cable 105 to another network device at the other end of cable 105. Such an optoelectronic isolation circuit may be referred to as an optoelectronic coupler, and may typically include a light-emitting diode or a diode laser for emitting light that is modulated to carry an input electrical signal carrying data or information and a photodetector that is coupled to receive the modulated light and to convert the modulated light back into an electrical signal carrying the data or information. This two stage conversion from the electrical signal to light and from light to another electrical signal provides an isolation between the input electrical signal and the output electrical signal. The light-emitting diode may be driven by the physical layer circuit 130 causing an optical signal to be generated. The photodetector in the optoelectronic isolator responds to the emitted light thereby regenerating the signal used to drive the light-emitting diode. The light-emitting diode side of the optoelectronic coupler may be electrically decoupled or isolated from the photodetector side of the optoelectronic coupler. For a received signal, another optoelectronic devices with light-emitting diode connected to a twisted pair from physical interface 110 driven by another network interface at the other end of cable 105. The optical signal generated by the light-emitting diode may be regenerated by the photodetector and provided to physical layer circuit 130 as a receive signal.

In some example embodiments, first multi-level isolation circuit 120 may include coupled magnetic devices. A coupled magnetic device may include, for example, two inductors that are magnetically coupled to each other. One of the coupled inductors may be driven by a driver in the physical layer circuit 130 causing a magnetic field to be generated that is coupled to the second inductor. The magnetic field generated by the first inductor may induce a current on the second inductor thereby regenerating the signal used to drive the first inductor. Because the inductors are magnetically coupled and only changing currents in the first inductor induce a current on the second inductor, the two inductors are DC isolated but allow AC signals representative of data to pass. For a received signal, another coupled magnetic device such as coupled inductors may be connected to a twisted pair from physical interface 110 driven by a driver at another network interface at the other end of cable 105. The current generated by the magnetically coupled device (e.g., two inductors) may be regenerated and provided to physical layer circuit 130.

First multi-level isolation circuit 120 enables a DC voltage isolation at physical layer circuit 130 and a DC voltage isolation at MAC and upstream network circuit 150 to be selected independently from the DC voltage isolation on the twisted pairs at physical interface 110. Likewise, second multi-level isolation circuit 140 enables a DC voltage isolation at physical layer circuit 130 and a DC voltage isolation at physical interface 110 to be selected independently from a DC voltage isolated MAC and upstream network circuit 150. In the example of FIG. 1, the DC voltage isolation value at 105A of physical interface 110 may be determined by the DC voltage from another network device connected to the other end of cable 105. If no cable 105 is connected, the DC voltage at 105A of physical interface 110 may be floating or set by a pull-up or pull-down resistor or other circuit in physical interface 110 or first multi-level isolation circuit 120. In this way, the DC voltage at one side of a network circuit may be different from another side of the network circuit.

In some implementations, physical layer circuit 130 may include a physical layer circuit and additional downstream components. Network circuits may be referred to as "upstream" circuits when they are deeper inside the signal processing chain. For example, the MAC layer is upstream of the physical layer circuit; the link layer is upstream of the MAC layer. etc.

Second multi-level isolation circuit 140 may provide voltage isolation between physical layer circuit 130 and MAC and upstream network circuit 150. For example, second multi-level isolation circuit 140 may isolate wires carrying transmit and receive serial data streams between MAC and upstream network circuit 150 and physical layer circuit 130. In some example embodiments, two differential wires may carry the transmit serial data stream from MAC and upstream network circuit 150 to physical layer circuit 130. Second multi-level isolation circuit 140 may isolate each of the two differential wires with a capacitor, coupled magnetic device, optoelectronic device or semiconductor device as described above. In some example embodiments, the second isolation circuit may provide a larger isolation voltage than the first multi-level isolation circuit 120. For example, second multi-level isolation circuit 140 may provide a breakdown voltage of 2000 volts (or other voltage) and first multi-level isolation circuit 120 may provide a breakdown voltage of 50 volts (or other voltage). In another example, first multi-level isolation circuit 120 may provide a breakdown voltage of 600 volts (or other voltage) and second multi-level isolation circuit 140 may provide a breakdown voltage of 1500 volts (or other voltage). In some example embodiments, two differential wires may carry the receive serial data stream from the physical layer circuit 130 to the MAC and upstream network circuit 150, and two differential wires may carry the transmit serial data stream from the MAC and upstream network circuit 150 to the physical layer circuit 130. Second multi-level isolation circuit 140 may isolate each of the two differential receive wires and each of the two differential transmit wires with a capacitor or other isolation device as described above. Thus, in some example embodiments, four isolation devices may isolate physical layer circuit 130 from MAC and upstream isolation circuits 150. In some example embodiments, second multi-level isolation circuit 140 may include more than one isolation device connected in series per transmit and receive differential wire. For example, two or more capacitors may be inserted in series with each of one or more wires in multi-level isolation circuit 140. For example, two capacitors may be inserted in series with each wire of a twinaxial cable included in second multi-level isolation circuit 140 providing the transmit or receive serial data stream. In this example, when two twinaxes are used, 8 capacitors ((2 wires for transmit+2 wires for receive)×2 capacitors per wire=8 capacitors) may be included in second multi-level isolation circuit 140. In this way, the isolation of a wire may be multi-level because two isolation devices are inserted in series to produce electrical isolation.

In some example embodiments, second multi-level isolation circuit 140 may include high breakdown voltage devices or circuits such as devices with high dielectric strength. In some example embodiments, the second multi-level isolation circuit 140 may be required to withstand a 2000 volt difference depending on the application and/or applicable standard such as IEEE 802.3. For Ethernet requirements see IEEE 802.3 Standard for Ethernet, published in 2015 by the Institute for Electrical and Electronic Engineers. High breakdown voltage devices may be more expensive than lower breakdown voltage devices. Thus, reducing the number of high breakdown voltage devices may reduce the cost of the network apparatus. Second multi-level isolation circuit 140 enables the DC voltage at 105C to be isolated, or independently selected, from the voltage at 105D in the same manner as described above with respect to first multi-level isolation circuit 120 and voltages 105A and 105B. For the same reasons as described above with respect to the difference in voltages between 105B and 105C due to chips and other circuits in physical layer circuit 130, voltages 105D and 105E may differ due to chips and other circuits in MAC upstream network circuit 150. Additional (or fewer) isolation circuits may be added (removed) to the signal chain 105-105E providing additional isolated DC voltage levels.

Although FIG. 1 depicts two isolation circuits—first multi-level isolation circuit 120 and second multi-level isolation circuit 140—additional isolation circuits may be included. For example, a third isolation circuit (not shown in FIG. 1) may be cascaded at 105D. The third isolation circuit may provide flexibility in place isolation components on the PCB board for ease of manufacturing, lower cost or other reasons. Additional isolation circuits may be added in a similar manner. With the addition of each isolation circuit, another independent voltage level may be selected associated with the added isolation circuit. On the other side, some implementations can use only one multi-level isolation circuit to achieve the isolation requirements.

Each isolation circuit may provide a predetermined maximum voltage isolation. For example, first multi-level isolation circuit 120 may provide greater than or equal to 50 volts of DC isolation between 105A and 105B. Second multi-level isolation circuit 140 may provide higher voltage isolation, or cascade of lower voltage isolation. For example, second multi-level isolation circuit 140 may provide greater than or equal to 2000 volts of DC isolation between 105C and 105D. In some example embodiments, the total isolation may be the sum of isolation voltages provided by a series of isolation circuits between 105A and 105D. For example, 2050 volts total due to 50 volts from a first isolation circuit and 2000 volts from a second isolation circuit. In this way, the voltage isolation provided at each circuit such as physical layer circuit 130 and MAC and upstream network circuit 150 can be selected or designed as well as the DC voltages isolation at each circuit.

MAC and upstream network circuit 150 include network circuits upstream of physical layer circuit 130. For example, when physical layer circuit 130 includes a physical layer (and no further upstream circuits), then MAC and upstream networking circuits 150 includes a MAC layer circuit, link layer circuit, and so on upstream. In another example, three isolation circuits may be used where one isolation circuit lies between the physical interface 110 and downstream network processing including a physical layer circuit, another isolation circuit may lie between the physical layer circuit and a MAC layer circuit but located at proximity of the physical layer circuit, and the third isolation circuit may lie in the proximity of the MAC layer circuit and further upstream networking circuits. Additional isolation circuits may be included between the second and third isolation in the form of high dielectric materials in the connecting wire and different network circuit partitioning may be used. In this way, the network circuits may be partitioned into various blocks with isolation circuits inserted between the blocks.

A physical layer circuit may perform functions such as a transmitter to drive a transmit wire or twisted pair. The transmitter of the physical layer circuit may convert digital data into analog signals on a cable such as network cable 105. A physical layer circuit may also perform functions such as a receiver to receive a signal via receive wire or twisted pair. The receiver of the physical layer circuit may convert analog voltages or currents on a cable such as network cable 105 into digital data. Other functions may also be performed by a physical layer circuit. The output of the physical layer circuit may be a serial digital data stream. For example, a physical layer circuit may provide a 10 Gigabits per second serial data stream to MAC layer as received data. Continuing the previous example, another 10 Gigabit per second serial data stream may be provided from MAC layer to the physical layer circuit for data to be transmitted. In some example embodiments, physical layer circuit 130 may include an integrated circuit to perform the 10/100/1000/10000 Ethernet/Gigabit/10 Gigabit Ethernet and/or other physical layer functions. See IEEE 802.3 Standard for Ethernet as noted above.

A MAC layer circuit may perform functions such as multiple access, addressing different nodes, protection against errors, frame delimiting, and other functions. The input to and output from the MAC layer circuit may be serial digital data stream. For example, a physical layer circuit may provide received data as a 10 Gigabit per second serial data stream to a MAC layer, and transmit data as another 10 Gigabit per second serial data stream to the physical layer circuit. In some example embodiments, MAC layer circuit may include an integrated circuit to perform the 10/100/1000/10000 Ethernet/Gigabit/10 Gigabit Ethernet and/or other MAC layer functions.

MAC and upstream network circuit 150 may be powered by second power supply 118. Second power supply 118 may also power other upstream network processing circuits (not shown in FIG. 1). Second power supply 118 may also power user interface circuits and management and control circuits. Second power supply 118 may power multiple MAC and upstream network circuits 150. Second power supply 118 may be isolated from first power supply 117 and may be isolated from other isolated power supplies of the multiple network apparatuses included in a switch, router, or other device. Under this configuration, power supply 118 does not share a common reference such as a ground reference with first power supply 117 or physical layer circuit 130. Physical layer circuit 130 may be powered by first power supply 117. First power supply 117 may be isolated from the rest of network apparatus 100. For example, power supply 117 may be isolated from power supply 118, and isolated from MAC and upstream network circuit 150 and second multi-level isolation circuit 140, and isolated from other network apparatuses. Isolated power supply 117 may "float" in absolute potential with respect to power supply 118. For example, isolated power supply 117 may be offset in voltage from power supply 118. In some example embodiments, power supply 117 may provide power to power supply 118 while still remaining isolated. In some example embodiments, a bleeder device may be placed between the different reference voltages while still providing isolation. In some example embodiments, one or more isolation circuits may include powered active devices. When powered, the isolation circuit may receive power from a downstream (or upstream) power supply. For example, when second multi-level isolation circuit 140 is powered, it may be powered by second power supply 118 (downstream of second multi-level isolation circuit 140). In some example embodiments, one or more isolation circuits include unpowered passive devices.

Figure 1A:
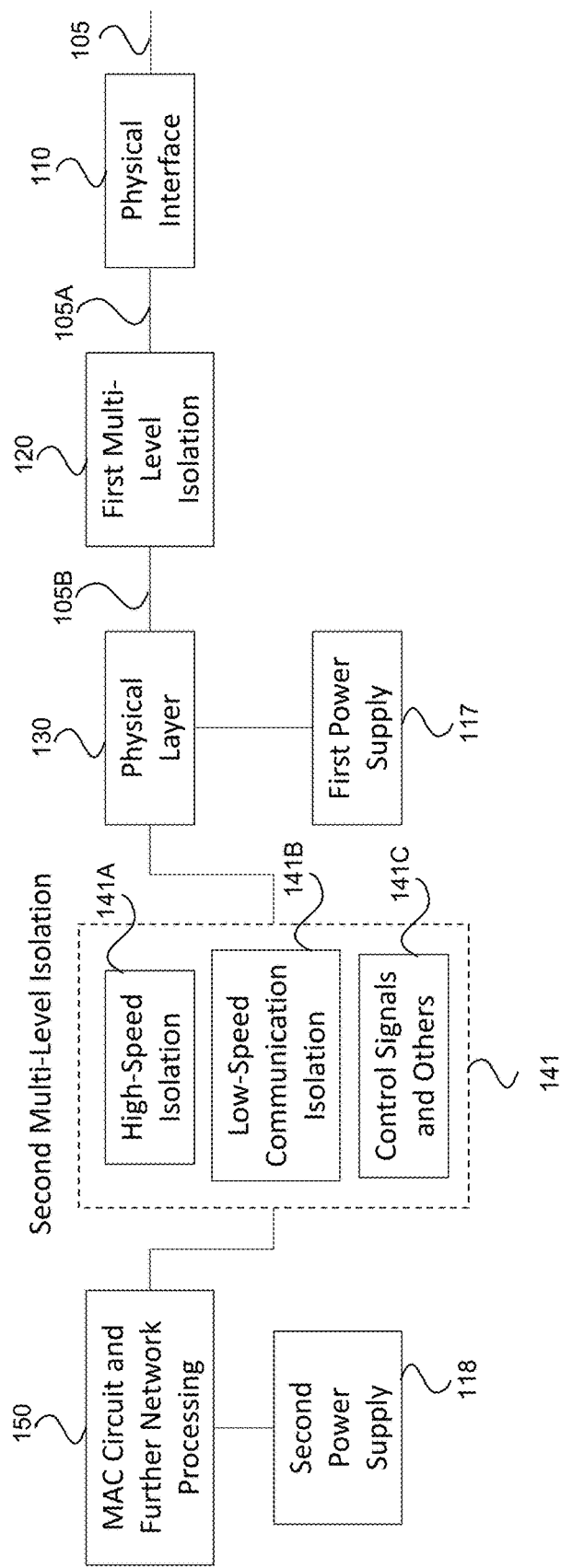
FIG. 1A depicts another example of a network apparatus including high-speed, isolation, control signals, and low-speed communication isolation, in accordance with some example embodiments.

FIG. 1A depicts an example of a network apparatus in a high-speed networking system. The description of FIG. 1A also refers to FIG. 1. See FIG. 1 for the description of physical interface 110, first multi-level isolation circuit 120, physical layer circuit 130, and power supplies 117 and 118.

Second multi-level isolation circuit 141 may provide isolation between physical layer circuit 130 and MAC and further network processing circuit 150. FIG. 1A depicts high-speed serial communication such as that in an Ethernet apparatus. In some example embodiments, a second multi-level isolation circuit 141 may include different isolation components to accommodate different signals such as high-speed communications, low-speed communications, and/or control signals. For example, some wires may pass through optoelectronic isolators and other wires may pass through one or more capacitors, or other isolation components. Multi-level isolation may provide isolation of DC voltage differences between network adapter 100 and another network adapter so that a DC current does not flow. Included in the example of FIG. 1A, are multiple isolation circuits within second multi-level isolation circuit 141. For example, second multi-level isolation circuit 141 may include a high-speed isolation circuit 141A similar to the second multi-level isolation circuit 140 described with respect to FIG. 1. For example, 141A may provide isolation for high-speed serial signals passed from physical layer 130 to MAC and further network processing 150. The second multi-level isolation circuit 141 at 141A can use high breakdown voltage capacitors to isolate high-speed communication as described with respect to FIG. 1, for example. Multi-level isolation circuit 141 may further include a low-speed isolation circuit 141B. Low-speed isolation circuit 141B may include isolation circuits that are different and may be less expensive than the isolation circuits included in 141A. For example, 141A may include capacitors, and 141B may include an inexpensive transformer. Second multi-level isolation circuit 141 may further include a means to pass control signals and/or other signals through 141. In some example embodiments, the control signals may be isolated via isolation circuits in 141C. The control signals, low-speed communications, and others can be isolated using lower cost isolation circuits. For example, a transformer, or other magnetic device, or the combination of isolation devices may be used to achieve different isolation and speed requirements of the various signals passing from physical layer 130 to MAC circuit and further network processing circuit 150.

As described above, the isolation circuits for a high-speed networking system may include high-breakdown voltage capacitors for high-speed communication, inexpensive transformers for low-speed circuits, and/or other isolation devices for control signals. Other combinations of isolation circuits and devices may be used for high-speed communications circuits, low-speed circuits, and/or control signals. Without loss of generality, a general network system is described in FIGS. 2-12. The second multi-level isolation circuit in FIG. 1A may be applied to FIGS. 2-12 for high-speed networking circuits.

Figure 2:
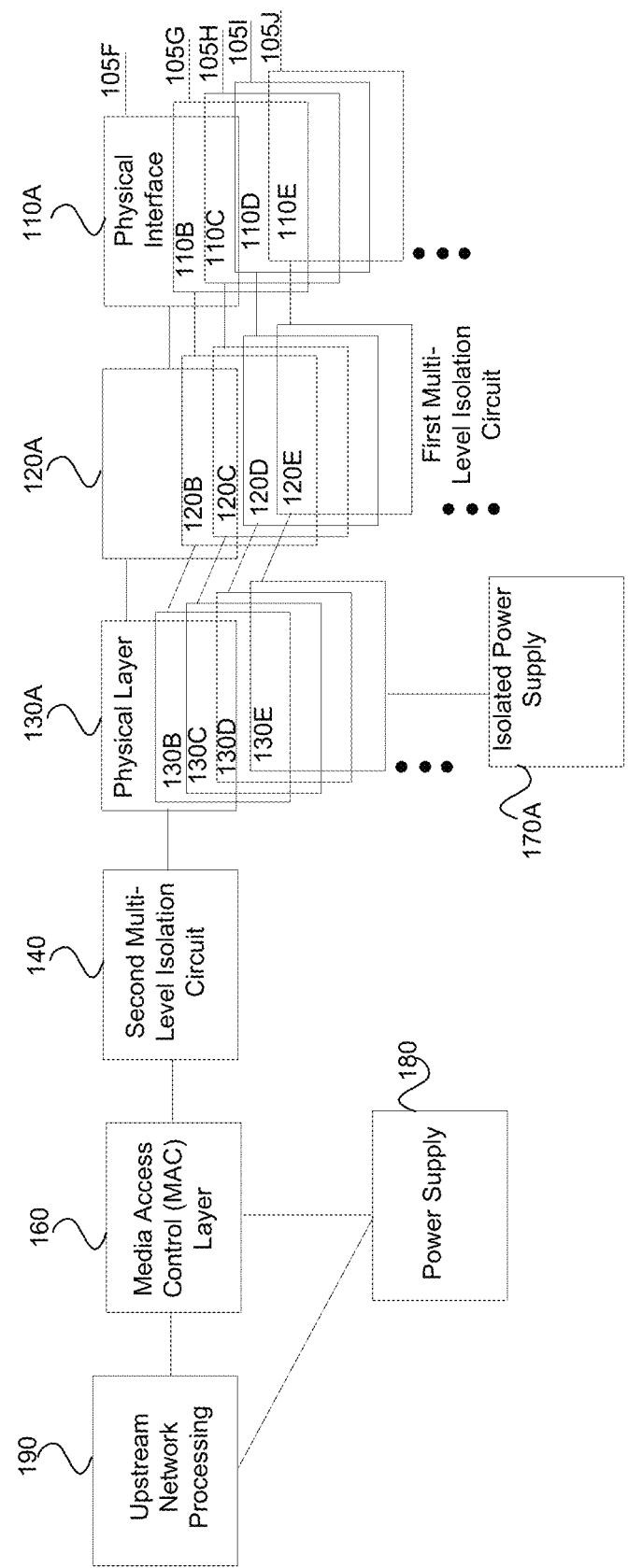
FIG. 2 depicts another example of a network apparatus, in accordance with some example embodiments.

FIG. 2 depicts another example of a network apparatus which can be a switch or router in accordance with some example embodiments. FIG. 2 depicts multiple physical interfaces, multiple DC isolation circuits, multiple physical layer circuits, and a single multi-level high-voltage isolation circuit, single MAC layer circuit and upstream network processing. The description of FIG. 2 also refers to FIG. 1, and FIG. 1A.

As noted above, a router, switch, or other networking device may include multiple network apparatuses to connect to multiple devices. In the example of FIG. 2, the physical interfaces such as RJ-45 connectors include physical interfaces 110A, 110B, 110C, 110D, 110E. Any other number of physical interfaces may also be used. Each physical interface such as physical interface 110A may connect two to four twisted pairs from a network cable such as network cable 105F to a DC isolation circuit such as first multi-level isolation circuit 120A. Each DC isolation circuit such as first multi-level isolation circuit 120A may also connect to a physical layer such as physical layer 130A. Another network cable such as network cable 105G may connect through physical interface 110B to first multi-level isolation circuit 120B and then to physical layer circuit 130B. Any number of other network cables, DC isolation circuits, and physical layer circuits may be connected in the same way. Physical layer circuits such as physical layer circuits 130A-130E may each have a transmit serial data stream and a receive serial data stream. The combination of the transmit serial data streams such as the transmit serial data streams to physical layers 130A-130E may be combined into a single stream. For example, multiple data streams may be combined into a single data stream by interleaving the individual data streams to produce a single stream. For example, interleaving may result in the first bit corresponding to physical layer 130A, the second bit corresponding to 130B, the third bit corresponding to 130C, and so on. When the first bit of the last serial stream is combined into the combined stream, the cycle may repeat. In this way the receive serial data streams from physical layer circuits 130A-130E in FIG. 2 may be combined into a single combined receive serial data stream. In some example embodiments physical layer circuits 130A-130E may be included on one integrated circuit that also includes the above-described function. The single receive data stream may pass through second multi-level isolation circuit 140 which may include a pair of high breakdown voltage capacitors as described above. The transmit serial data streams from MAC layer circuit 160 to physical layer circuits 130A-130E in FIG. 2 may be combined into a single combined transmit serial data stream. The single transmit data stream may pass through second multi-level isolation circuit 140 which may include another pair of high breakdown voltage capacitors as described above.

Power supply 180 may supply power to MAC layer circuit 160 and upstream networking processing circuits 190. Isolated power supply 170A may supply power to physical layer circuits 130A-130E. For example isolated power supply 170A may supply power to physical layer circuit 130A, 130B, 130C, 130D, and/or 130E. In this way the physical layer circuits 130A-130E may share the same power supply. Isolated power supply 170A is isolated from power supply 180 and the above-described circuits associated with power supply 180.

Figure 3:
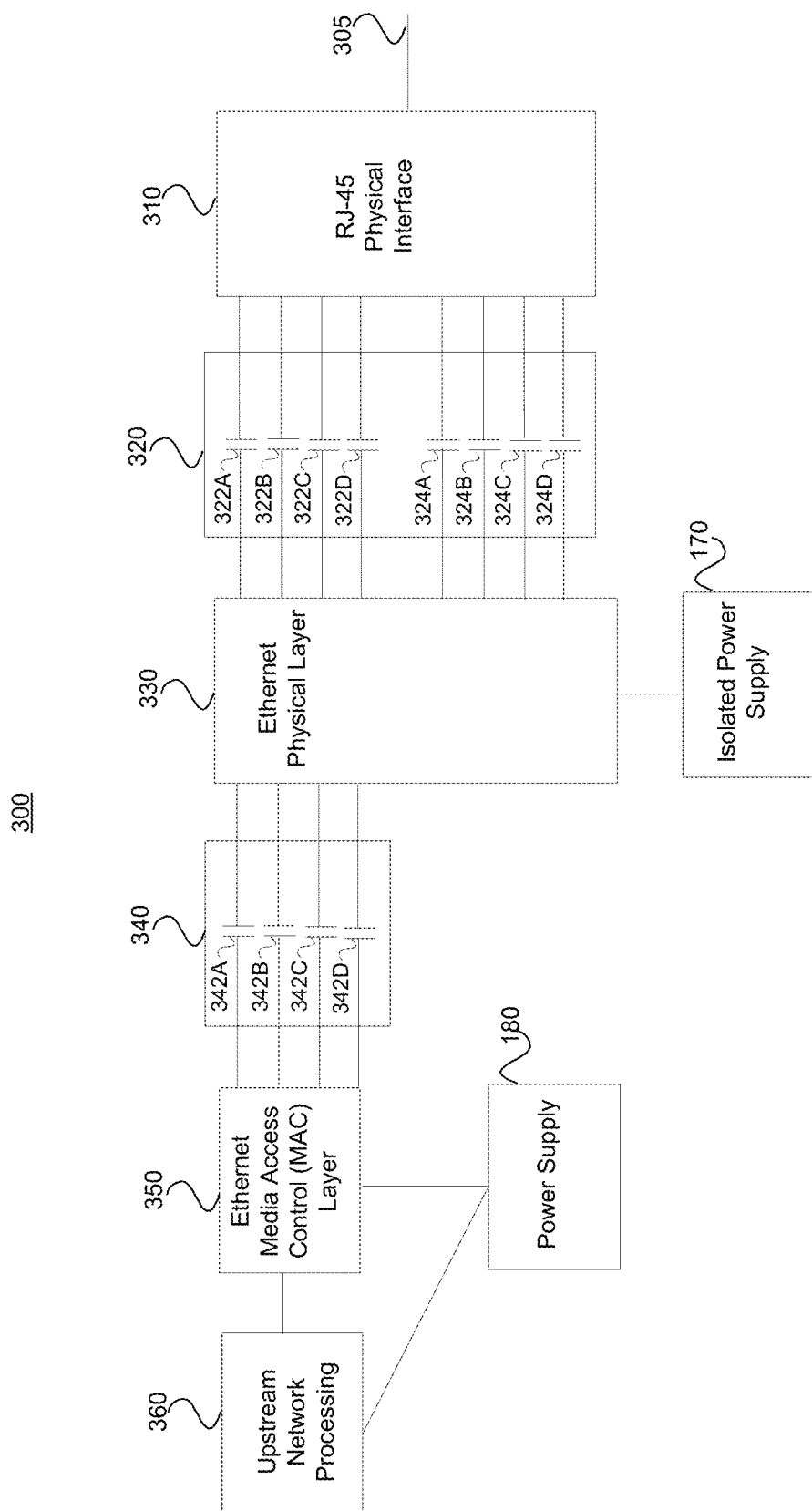
FIG. 3 depicts an example of a Ethernet network apparatus, in accordance with some example embodiments.

FIG. 3 depicts an example of an Ethernet network apparatus 300, in accordance with some example embodiments. The description of FIG. 3 also refers to FIGS. 1, 1A, and 2. Network apparatus 300 includes physical interface 310, DC isolation circuit 320, Ethernet physical layer circuit 330, high-voltage isolation circuit 340, Ethernet MAC layer circuit 350, and upstream network processing 360.

In the example of FIG. 3, the Ethernet physical interface 310 includes an RJ-45 connector. The Ethernet physical interface 310 connects to a mating RJ-45 connector attached to an Ethernet cable that may include four twisted pairs of wires. Each wire may connect to a DC isolation capacitor in DC isolation circuit 320. For example a first wire of a first twisted pair may connect to 322A, and a second wire of the first twisted pair may connect to 322B, a first wire of a second twisted pair may connect to 322C, and a second wire of the second twisted pair may connect to 322D. Capacitors 324A-D may connect to two additional twisted pairs. In some example embodiments, two twisted pairs are used and accordingly 322A-D or 324A-D are used, and in other embodiments four twisted pairs are used and eight capacitors 322A-D and 324A-D are used. The side of DC isolation capacitors 322A-D, 324A-D not connected to the RJ-45 connector are connected to Ethernet physical layer circuit 330. Ethernet physical layer circuit 330 is powered by isolated power supply 180 as detailed above. Ethernet physical layer circuit may include an integrated circuit to perform a portion or all of the Ethernet physical layer functions. Ethernet physical layer circuit 330 may connect to an Ethernet MAC layer circuit through high-voltage isolation circuit 340. Ethernet physical layer circuit 330 may include a transmit serial data stream from MAC layer circuit 350 to physical layer circuit 330, and a receive serial data stream from physical layer circuit 330 to MAC layer circuit 350. Each serial data stream may be a differential signal using two wires where each wire is connected to a high breakdown voltage capacitor. In this way, two high breakdown capacitors such as capacitors 342A and 342B may be used by the transmit serial data stream and capacitors 342C and 342D may be used by the receive serial data stream. High-voltage isolation circuit 340 may include high breakdown voltage capacitors as described above. Ethernet MAC layer circuit 350 may receive the serial data stream corresponding to the Ethernet receive data, and the Ethernet MAC layer circuit 350 may generate the serial data stream corresponding to the Ethernet transmit data. Further Ethernet processing is performed by upstream Ethernet network processing 360.

Figure 3A:
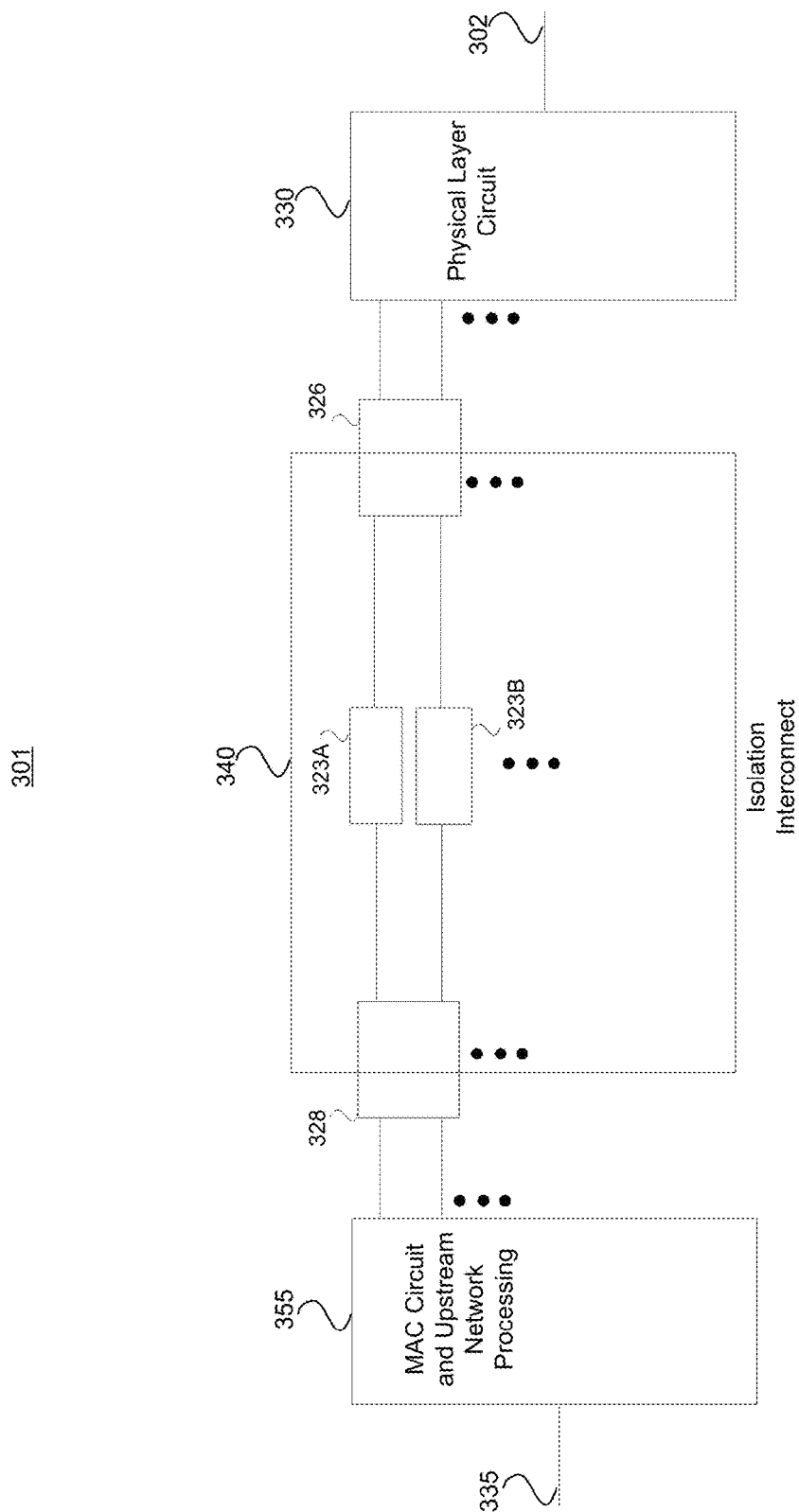
FIG. 3A depicts an example of an isolation interconnect, in accordance with some example embodiments.

FIG. 3A depicts an example of an isolation interconnect, in accordance with some example embodiments. Physical layer circuit 330 may connect to a physical interface through wires 302 and to isolation interconnect 340. Isolation interconnect 340 may further connect to MAC circuit and upstream network processing 355.

In some example embodiments, physical layer circuit 330 may include a physical layer chip, support circuits, and a first multi-level isolation circuit as described above. In some example embodiments, physical layer circuit 330 may be produced using an inexpensive printed circuit board (PCB) process such as a four-layer PCB on an FR4 substrate. Other substrates and numbers of layers may also be used. The substrate at 330 does not have to be a low-loss at high frequencies because the signals into 330 are lower frequency due to being parallel (carried by 4 twisted pair).

The signals out of 330 may be high-speed serial signals (one twisted pair for transmit and one twisted pair for receive) passed to connector 326, through isolation circuits such as isolation circuits 323A and 323B, and connector 328, to MAC circuit and upstream network processing 355. Several configurations of connectors 326 and 328, and isolation circuits 323A and 323B are possible. In some implementations, connectors 326 and 328 may include isolation components built into the connectors and 323A and 323B may be jumper wires. In this configuration, the series isolation components in connectors 326 and 328 form a two component multi-level isolation circuit as described above. Each isolation component may be the same or a different type of isolation component as described in the earlier figures. In other implementations, connectors 326 and 328 may be connectors without including isolation components and isolation circuits 323A and 323B may include two or more series isolation components as described above. For example, 323A and 323B may each include two series capacitors. In another implementation, physical layer circuit 330 may include an isolation component and MAC and upstream network processing circuit 355 may include another isolation component. In this implementation, connectors 326 and 328, and 323A and 323B may provide a direct connection between 330 and 335 with no isolation added by 326, 328, 323A, or 323B. In this case, the isolation is provided by the isolation components included in 330 and 335.

In some example embodiments, MAC and upstream network processing circuit 355 may include a MAC layer chip, and upstream network processing circuits. In some example embodiments, MAC and upstream network processing circuit 355 may be produced using a higher frequency lower-loss (PCB) such as a seven or eight layer PCB on a low-loss substrate. Other numbers of layers may also be used. The substrate at 355 may be low-loss at high frequencies because the signals into 355 are high frequency due the high speed serial signals out of the physical layer circuit 330 that may include multiple channels of physical layer signals. The overall cost of the circuit 300 may be reduced by enabling a less expensive PCB process for the physical layer circuit 330 thereby reducing the size and thus cost of the MAC and upstream circuit 355.

Figure 4A:
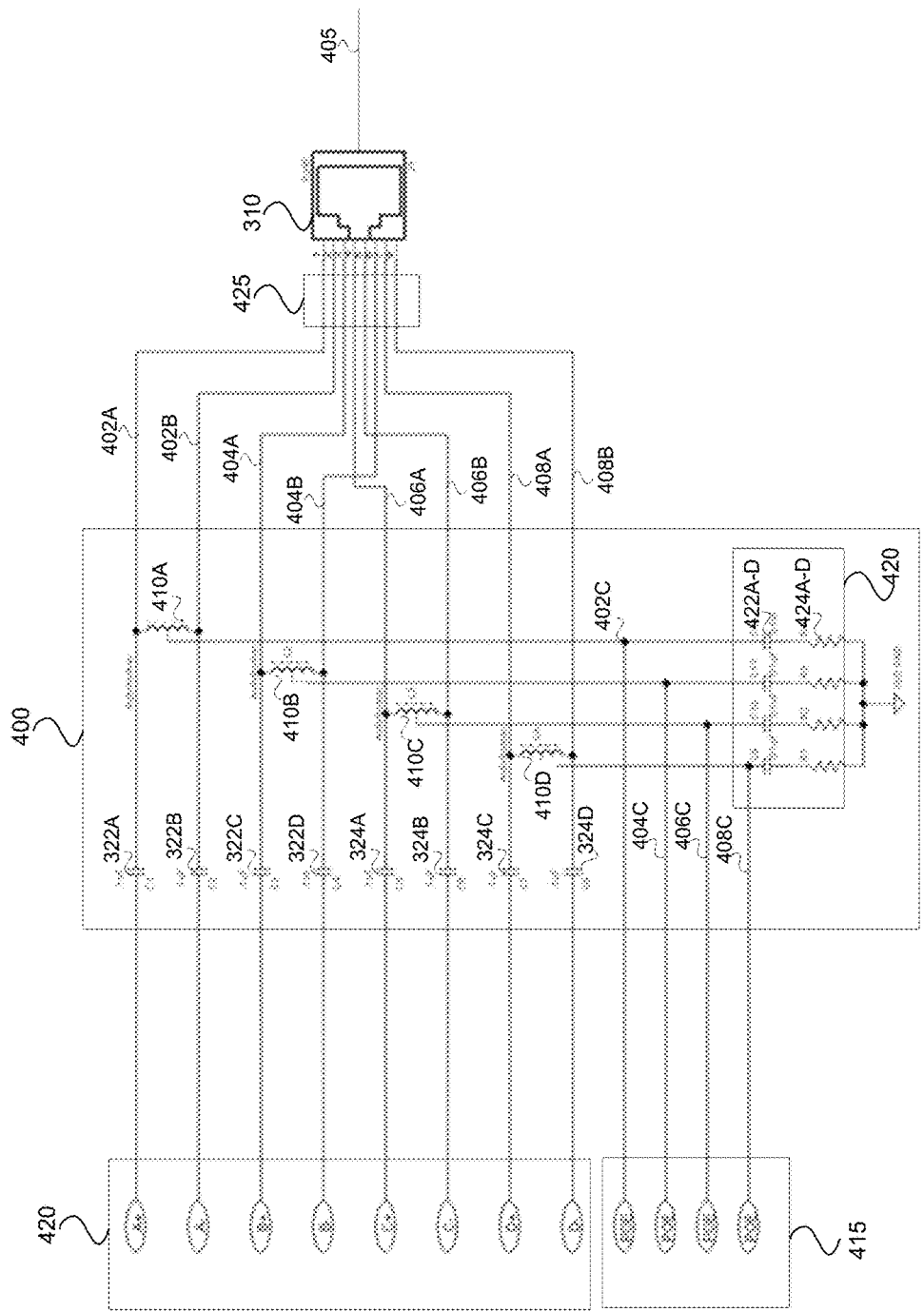
FIG. 4A depicts an example of a circuit for DC isolation providing power over Ethernet.

FIG. 4A depicts an example of a circuit for DC isolation providing power over Ethernet, in accordance with some example embodiments. The description of FIG. 4A also refers to FIGS. 1-3A. FIG. 4A depicts a physical interface 310 including an RJ-45 connector. Network cable 405 plugs into physical interface 310 providing connections to four twisted pairs or eight wires. Each twisted pair connects to two corresponding high breakdown voltage capacitors. For example, a first twisted pair 402A and 402B may connect to DC isolation 322A and 322B, a second twisted pair 404A and 404B may connect to 322C and 322D, a third twisted pair 406A and 406B may connect to 324A and 324B, and a fourth twisted pair 408A and 408B may connect to 324C and 324D. The other sides of the foregoing capacitors are shown as Ethernet signals and include A+. A−, B+, B−, C+, C−, D+ and D− at 420. Power over Ethernet may be provided via one or more autoformers placed with the inductor ends of the autoformer connected to a twisted pair. For example, one end of the inductor of autoformer 410A may connect to the network cable end of capacitor 322A, and the other end of the inductor of autoformer 410A may connect to the network cable end of capacitor 322B. Autoformers 410B-410D may be connected in the same manner to the remaining three twisted pairs. The centertaps of the autoformers may be connected to a series capacitor and resistor. For example, the centertap 402C of autoformer 410A provides power over Ethernet and connects to the series combination of capacitor 420A and resistor 422A. The centertaps of autoformers 410A, 410B, 410C, and 410D correspond to wires 402C, 404C, 406C, and 408C at power over Ethernet signals 415.

Figure 4B:
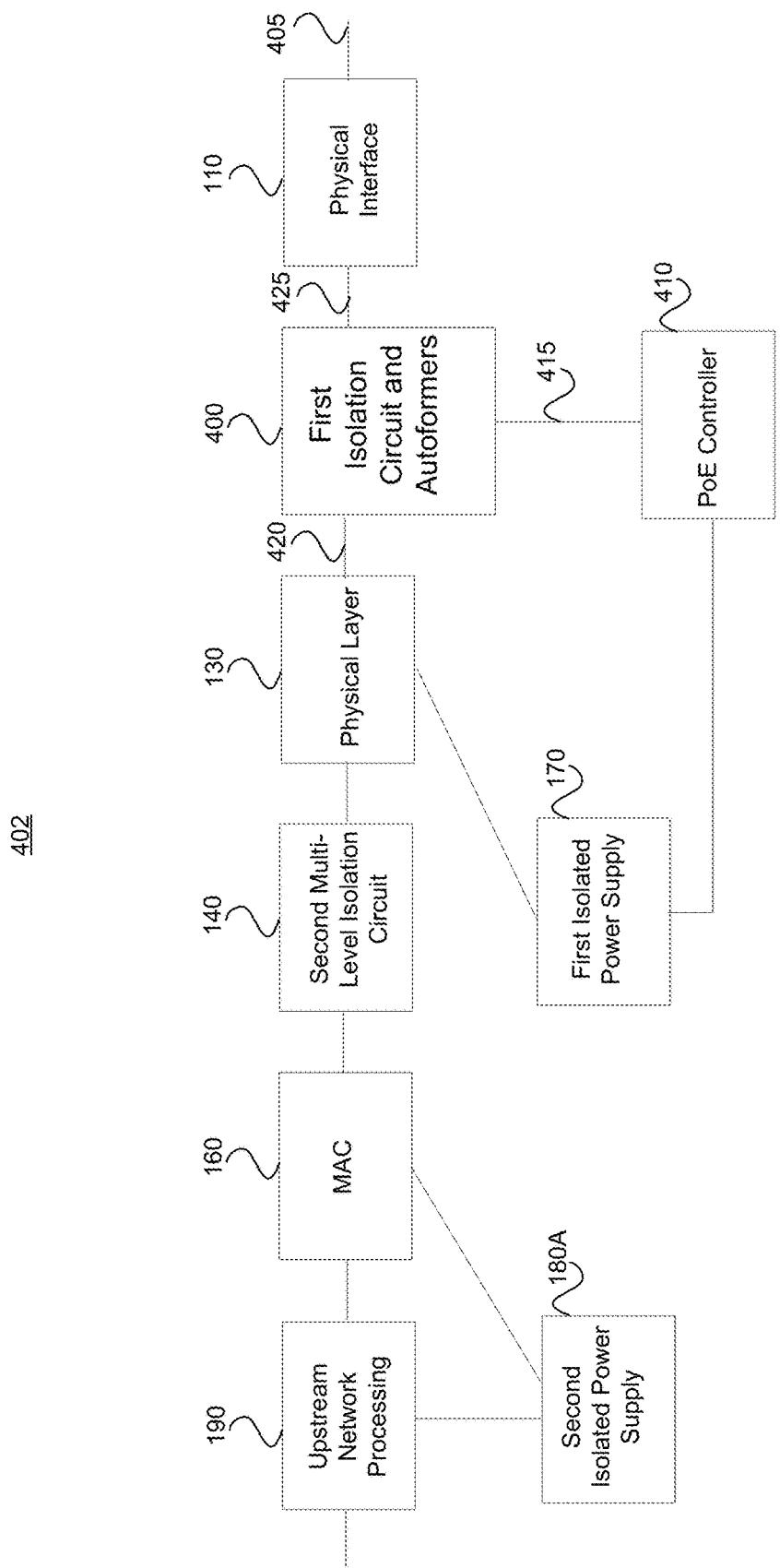
FIG. 4B depicts another example of a network apparatus including power over Ethernet.

FIG. 4B depicts another example of a network apparatus 402 including power over Ethernet. The description of FIG. 4B also refers to FIGS. 1-4A. FIG. 4B depicts physical interface 310 connected to network cable 405 on one side of first isolation circuit 400 as depicted in FIG. 4A. Circuit 400 may include autoformers such as autoformers 410A-410D shown in FIG. 4A. Power over Ethernet (PoE) controller 410 may supply power through PoE signals 415, physical interface 310, and network cable 405 to an Ethernet device at the other end of network cable 405 such as an access point. For example, PoE controller 410 may apply power to two or four of the wires in 425. PoE controller 410 may determine if a load is attached to the distant end of network cable 405 by determining the current flow with a predetermined applied voltage. In some example embodiments, a sequence of voltages may be applied via 415 to determine a load at the distant end of network cable 405. In some example embodiments PoE controller 410 may provide 15 Watts (W) of power to the load, or 30 W, 60 W, or 100 W, or another amount of power to the load at the distant end of cable 405. PoE controller 410 may be powered by power supply 170 and upstream network processing 190 may be powered by second isolated power supply 180A or an isolated DC-DC converter. Thus, the physical layer circuit 130 and the PoE controller 410 may share the same power supply without requiring high-voltage isolation such as a 2000 volt isolation between PoE controller 410 and physical layer circuit 130. Although one physical interface 310, DC isolation and autoformer circuit 400, and physical layer circuit 130 is shown, any number of physical interfaces, DC isolation and autoformer circuits, and physical layer circuits, may be included in a similar manner as described in the foregoing figures. Moreover, the second multi-level isolation circuit 140 may be cascaded or expanded to a multilevel isolation circuit between the physical layer circuit 130 and MAC 160 at any position as described above with respect to the foregoing figures.

Figure 4C:
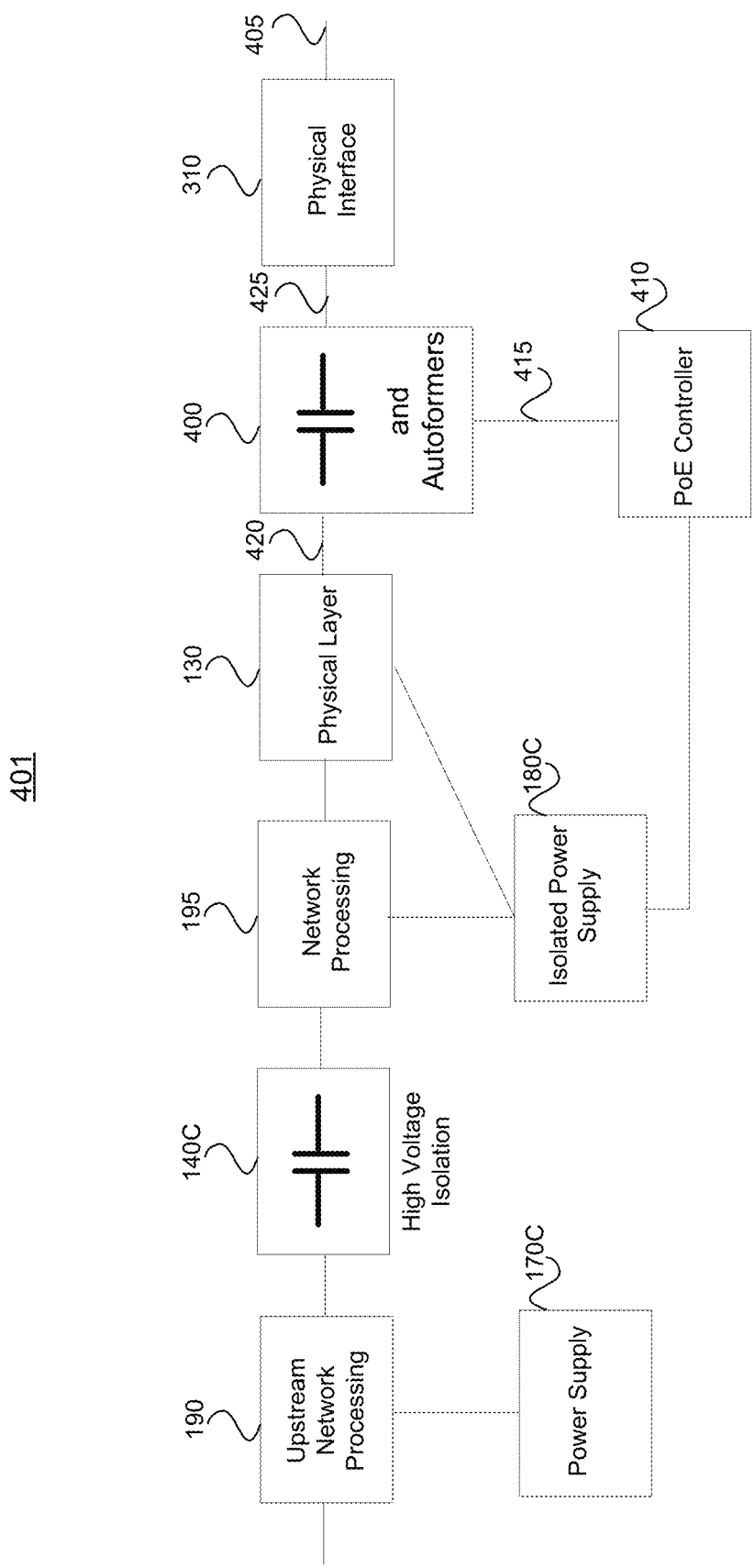
FIG. 4C depicts another example of a network apparatus including power over Ethernet.

FIG. 4C depicts another example of a network apparatus 401 including power over Ethernet. The description of FIG. 4C also refers to FIGS. 1-4B. FIG. 4C depicts physical interface 310 connected to network cable 405 on one side and DC isolation circuit 400 and physical layer circuit 130 on the other side. Circuit 400 includes autoformers 410A-410D. Wires 402A, 402B, 404A, 404B, 406A, 406B, 408A, and 408B are shown at 425 and connect physical interface 310 to DC isolation capacitors 322A, 32B, 322C, 322D, 324A, 423B, 324C, and 324D. The other sides of the foregoing capacitors are shown as Ethernet signals and include A+. A−, B+, B−, C+, C−, D+ and D− at 420. The centertaps of autoformers 410A, 410B, 410C, and 410D correspond to wires 402C, 404C, 406C, and 408C at power over Ethernet signals 415. Power over Ethernet (PoE) controller 410 may supply power through PoE signals 415, autoformers 410A-410D, through physical interface 310 and network cable 405 to an Ethernet device at the other end of network cable 405 such as an access point. For example, PoE controller 410 may apply one or more voltages and/or currents to one or more pairs of wires in 425. PoE controller 410 may determine if a load is attached to the distant end of network cable 405 by determining the current flow with a predetermined applied voltage. In some example embodiments, a sequence of voltages may be applied via 415 to determine a load at the distant end of network cable 405. In some example embodiments PoE controller 410 may provide 15 Watts (W) of power to the load, or 30 W, 60 W, or 100 W, or another amount of power to the load at the distant end of cable 405. PoE controller may be powered by isolated power supply 180C. Thus, the physical layer circuit 130 and the PoE controller 410 may share the same power supply without requiring high-voltage isolation such as a 2000 volt isolation between PoE controller 410 and physical layer circuit 130. Although one physical interface 310, DC isolation and autoformer circuit 400, and physical layer circuit 130 are shown, any number of physical interfaces, DC isolation and autoformer circuits, and physical layer circuits, may be included in a similar manner as described in the foregoing figures. For example, physical layer 130 may be connected to network processing 195 which is upstream of physical layer 130. Upstream of network processing 195 may be high voltage isolation 140C. For example, network processing 195 may include a media access layer (MAC). In this example, the MAC layer and physical layer may be downstream of high voltage isolation 140C, or equivalently, high voltage isolation 140C is upstream of MAC layer 195 and physical layer 130. The high-voltage isolation circuit 140C may be inserted upstream of the physical layer circuit at any other position of the network processing chain.

Figure 4D:
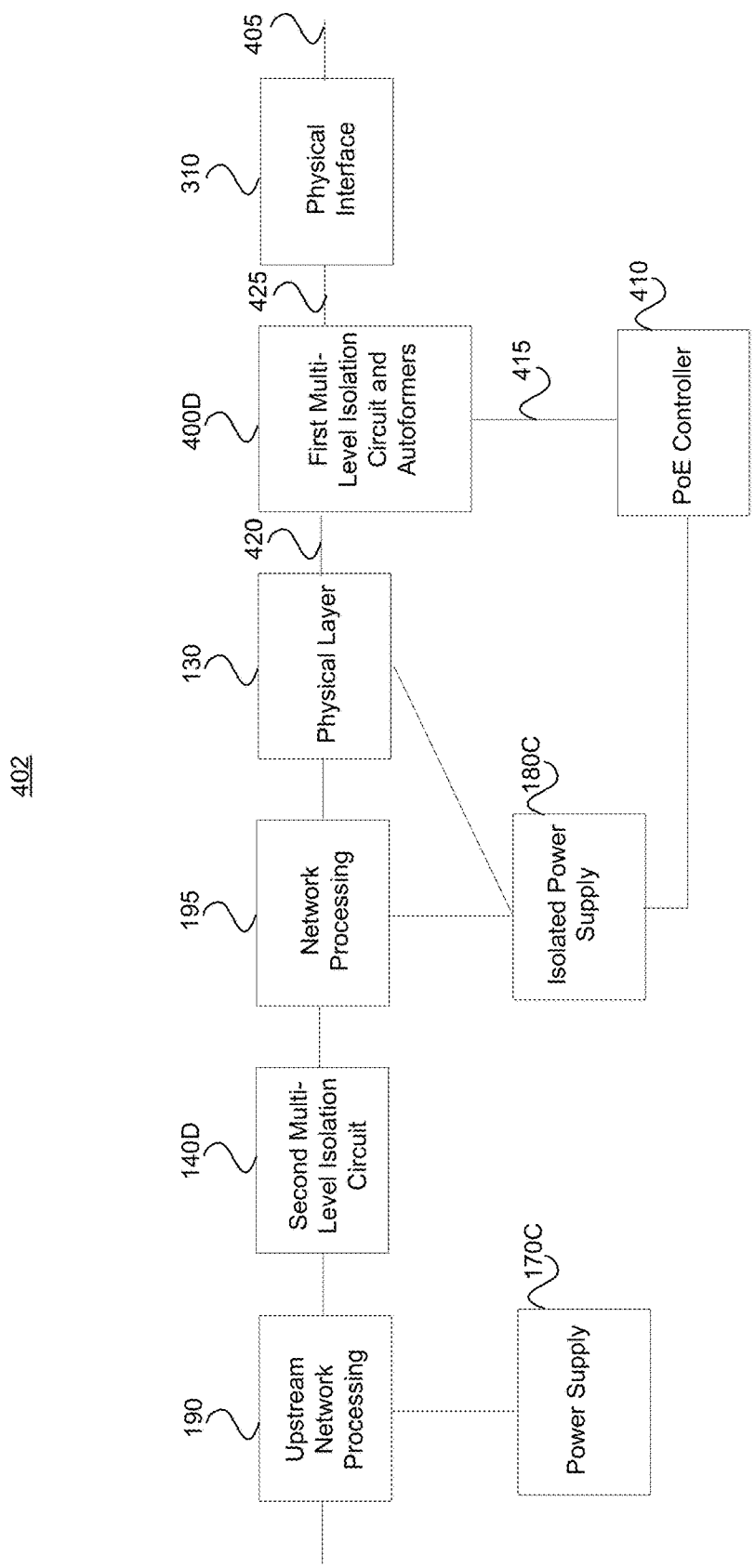
FIG. 4D depicts another example of a network apparatus including power over Ethernet.

FIG. 4D depicts another example of a network apparatus 402 including power over Ethernet. FIG. 4D is similar to FIG. 4C except that DC isolation and autoformer circuit 400 is more generally a first multi-level isolation circuit and autoformer 400D and high-voltage isolation circuit 140C is more generally a multi-level isolation circuit 140D, both described further in this patent document. A capacitor is an example of an isolation circuit/multi-level isolation circuit. Any of the other multi-level isolation circuits described in this patent document may be used at 140D and/or 400D.

Figure 4E:
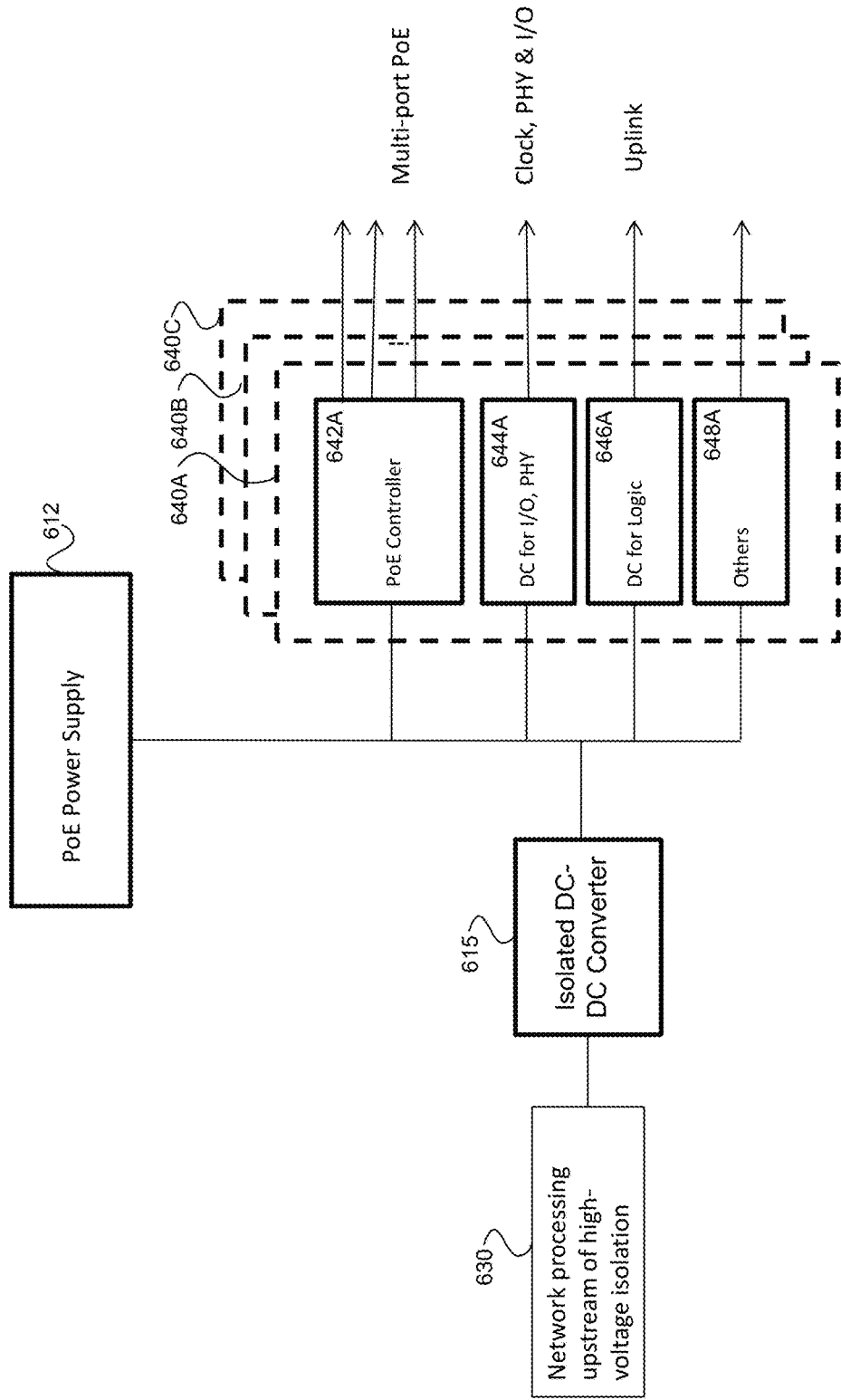
FIG. 4E depicts an example a power supply system for multi-port power over Ethernet, in accordance with some example embodiments.

FIG. 4E depicts an example power supply system 403 for multi-port power over Ethernet, in accordance with some example embodiments. The description of FIG. 4E also refers to FIGS. 1-4D. Power supply system 403 includes power over Ethernet (PoE) power supply 612 that is powered from another source such as an outlet supplying 120 VAC (not shown). PoE power supply 612 may supply power to circuits downstream of the high-voltage isolation circuit 140 or second multi-level isolation circuit shown in the figures. PoE power supply 612 may provide power to port power supplies 640A, 640B, and/or 640C. Although three port power supplies are shown in FIG. 4E, any other number of port power supplies may be used. Each port power supply such as port power supply 640A may provide a variety of voltages needed at the circuits downstream of high-voltage isolation circuit 140 and/or second multi-level isolation 140C/140D such as network processing 195, physical layer 130, and PoE controller 410 shown in FIG. 4B-D. Various voltages may be provided including multi-port power over Ethernet at 642A, a clock generator, physical layer circuit, input/output circuits at 644A, uplink/downlink at 646A, and other circuits at 648A. PoE power supply 612 may provide power to isolated power supply or isolated DC-DC converter 615 that may provide power to circuits that are upstream of high-voltage isolation circuit 140 and/or second multi-level isolation 140C/140D. In the example of FIG. 4E, power supply 615 may provide power to upstream network processing 630 and other circuits common to the network apparatus such as a network controller providing a user interface, and other common circuits. In the example of FIG. 4D, power provided by 615 may power the network processing upstream of the second multi-level isolation circuit 140D including upstream network processing 190. PoE power supply 612 may provide power through PoE controller 410 and autoformers 410A-D to an Ethernet connected device at the other end of network cable 405.

Figure 4F:
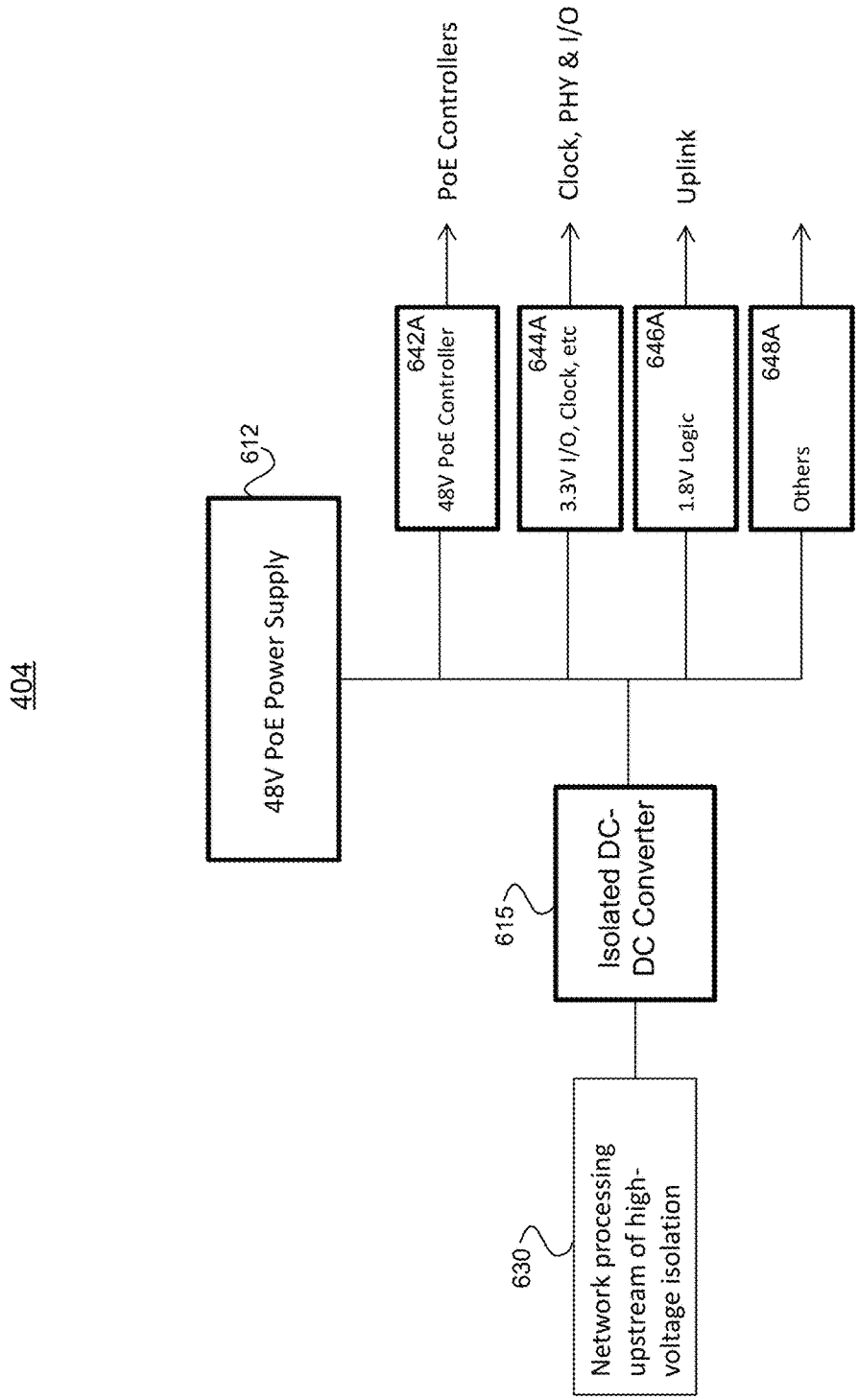
FIG. 4F depicts an example of a power supply system for power over Ethernet, in accordance with some example embodiments.

FIG. 4F depicts an example of a power supply system 404 for power over Ethernet, in accordance with some example embodiments. The description of FIG. 4F also refers to FIGS. 1-4E. FIG. 4F depicts the power supply shown in FIG. 4E with a single port power supply for a single Ethernet port with power over Ethernet.

Figure 4G:
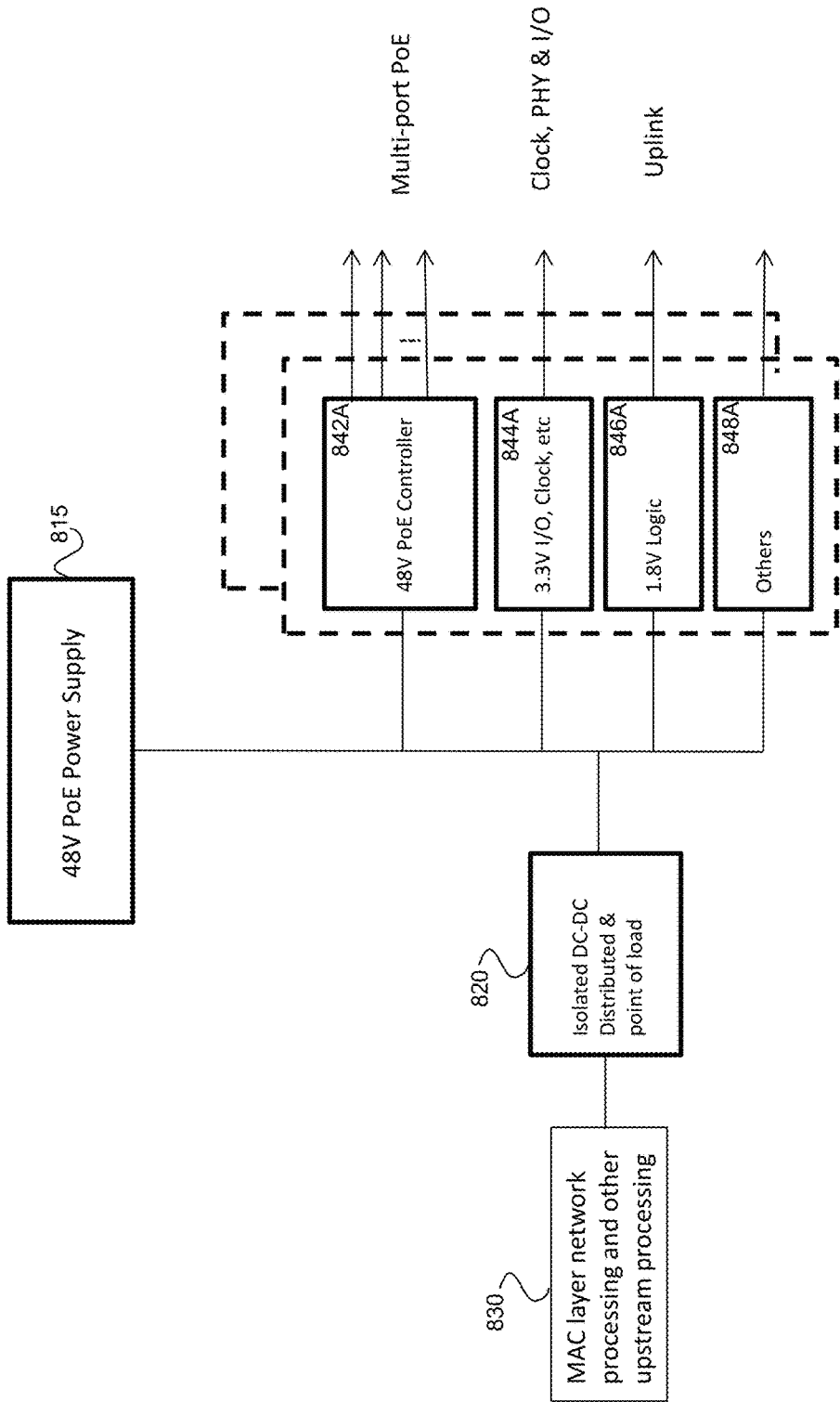
FIG. 4G depicts another example a power supply system for multi-port power over Ethernet, in accordance with some example embodiments.

FIG. 4G depicts another example a power supply system for multi-port power over Ethernet, in accordance with some example embodiments. The description of FIG. 4G also refers to FIGS. 1-4F. FIG. 4G depicts an example implementation of the power supply system shown in FIG. 4E. Power supply system 406 includes power over Ethernet (PoE) power supply 815 that is powered from another source such as an outlet supplying 120 VAC (not shown). PoE power supply 815 may supply power to circuits downstream of the high-voltage isolation circuit 140 or a second multi-level isolation circuit shown in the figures. PoE power supply 815 may provide power at 48 VDC to the two port power supplies shown in FIG. 4G. Each port power supply may provide a variety of voltages needed at the circuits downstream of high-voltage isolation circuit 140 or second multi-level isolation circuit. Various voltages may include 48 VDC to multi-port power over Ethernet at 842A, 3.3 VDC to clock generator, physical layer circuit, input/output circuits at 844A, 1.8 VDC to uplink/downlink at 846A, and voltage(s) for other circuits at 848A. Although specific voltages are listed in the foregoing, any other voltages may be provided instead of, or in addition to the voltages listed. PoE power supply 815 may provide power to an isolated power supply or isolated DC-DC converter 820 that may provide power to circuits that are upstream of high-voltage isolation circuit 140 or a second multi-level isolation circuit. In the example of FIG. 4G, power supply 820 may provide power to upstream network processing 830 and other circuits common to the network apparatus such as a network controller providing a user interface, and other common circuits.

Figure 5:
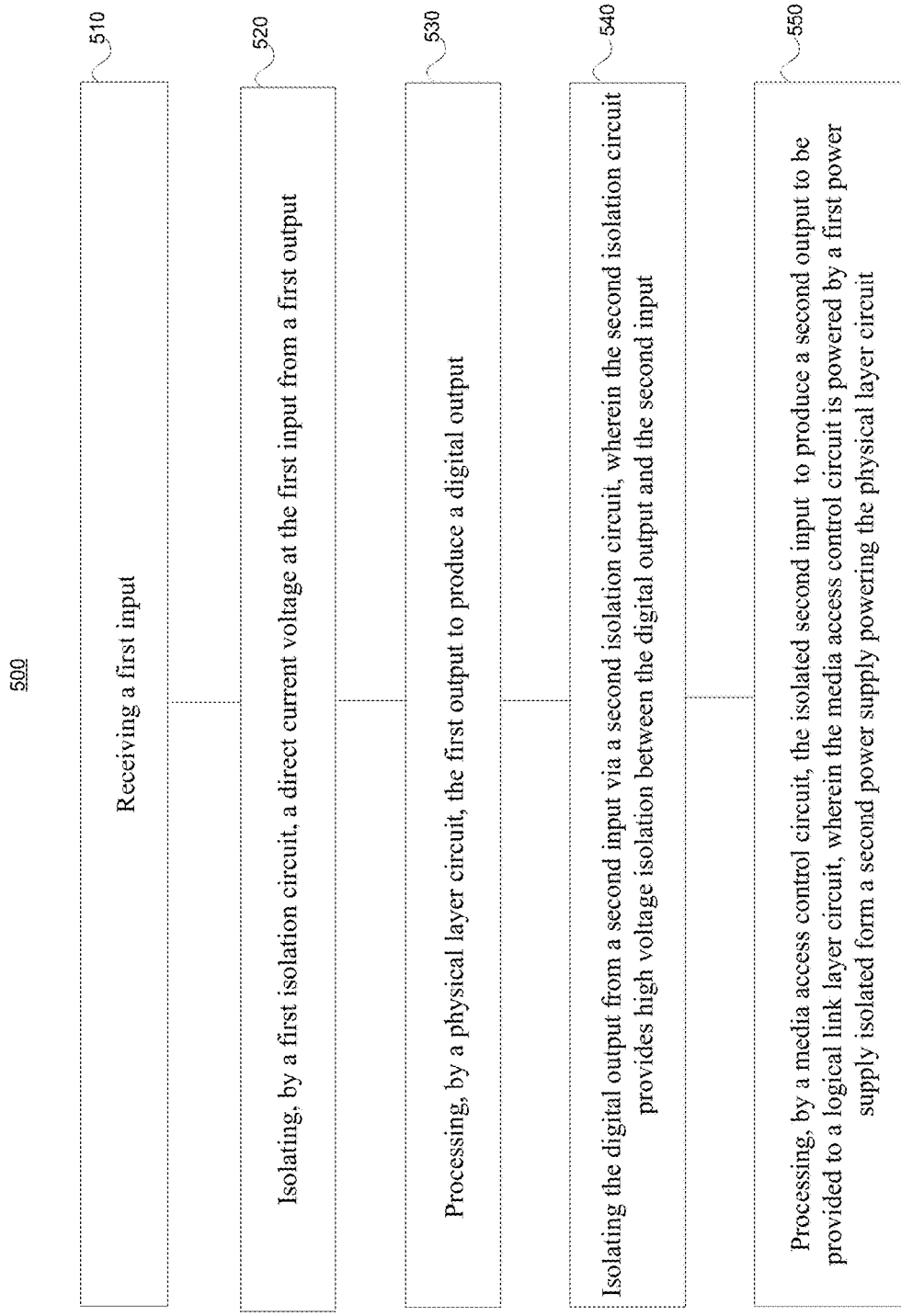
FIG. 5 depicts an example of a process, in accordance with some example embodiments.

FIG. 5 depicts an example of a process, in accordance with some example embodiments. The description of FIG. 5 also refers to FIGS. 1, 1A, 2-4A, and 4B. At 510, a first input is received. At 520, a first isolation circuit isolates a DC voltage from the first input to produce a first output. At 530, a physical layer circuit processes the first output to produce a digital output. At 540, the digital output is isolated with high-voltage isolation from the digital output to produce a second input. At 550, the isolated second input is processed by a media access control circuit and provided to a logical link layer circuit or other network processing.

At 510, a first input is received. For example, the first input may include voltage signals via a wire connected to a physical interface such as physical interfaces 110, 110A-110E, and/or 310 described above. The wire may be a wire in a network cable such as network cables, 105, 105F-105J, 305, and/or 405. The voltage signals may include modulated or encoded signals representing data.

At 520, a first isolation circuit may provide a DC isolation of the first input to generate a first output. The first isolation circuit may include the DC isolation circuits described above such as 120, 120A-120E, 320, and/or 400. The first isolation circuit may remove a DC voltage from the first input to generate the first output. In some example embodiments, the first isolation circuit may include capacitors with breakdown voltages of 50 volts, 250 volts, 600 volts, or any other voltage.

At 530, a physical layer circuit may generate a digital output from the first output. The physical layer circuit may include the physical layer circuits described above including 130, 130A-130E, and/or 330.

At 540, a second isolation circuit provides multi-level high-voltage isolation between the digital output from the physical layer circuit and a second input to a MAC layer circuit. The second isolation circuit may include high-voltage isolation circuits 140 and/or 340 described above. In some example embodiments the second isolation circuit may include high breakdown voltage capacitors with breakdown voltage of 1500 volts or 2000 volts.

At 550, a media access control circuit may process the isolated second input to produce a second output to be provided to upstream network processing circuits such as upstream processing circuits 190 and/or 360. The upstream network processing may include a logical link layer circuit. In some example embodiments the media access control circuit such as MAC layer circuit 160 and/or 350 and upstream processing circuits 190 and/or 360 may be powered by a second power supply such as power supply 180. Physical layer circuits such as physical layer circuits 120, 120A-120E, and/or 320 may be powered by a first power supply that is isolated from the second power supply as described above.

Figure 6:
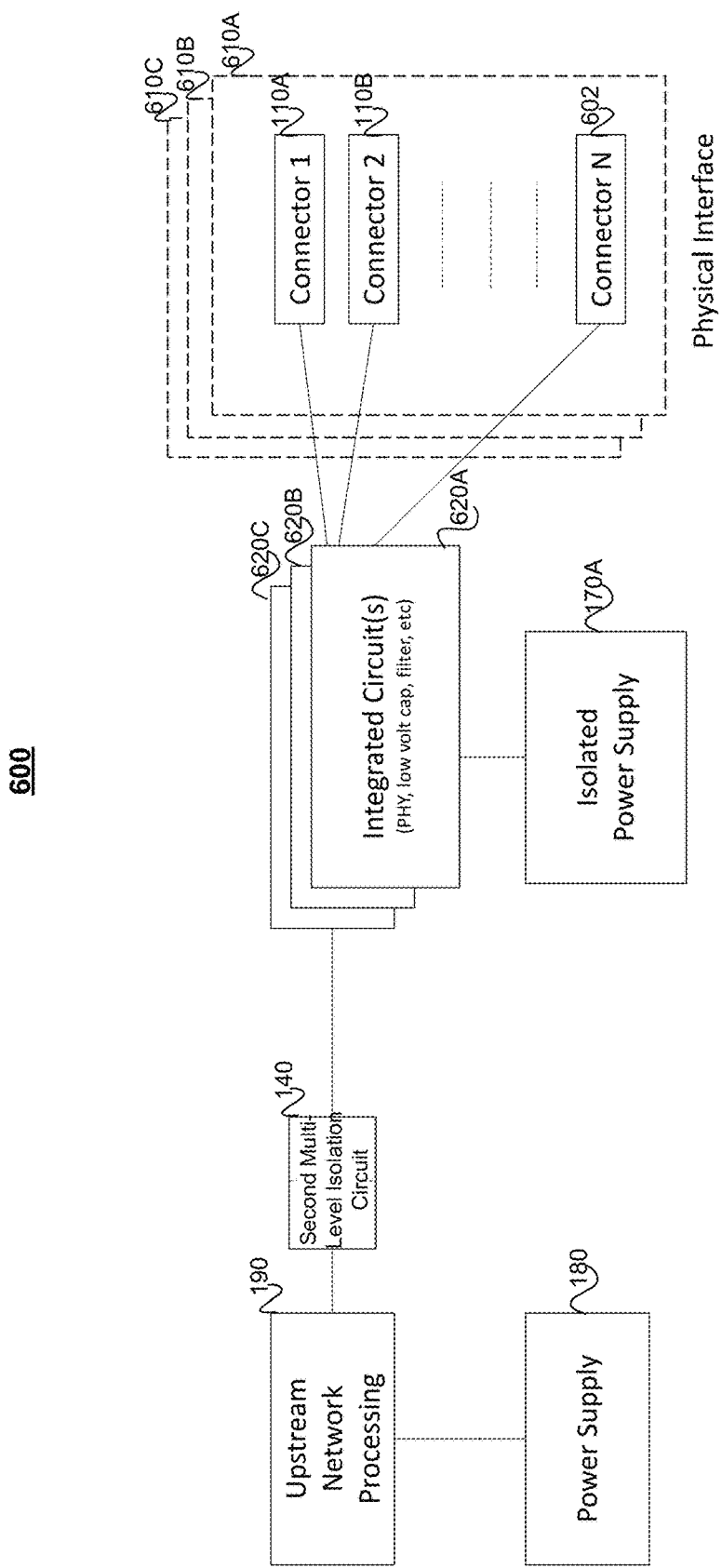
FIG. 6 depicts an example of a circuit for multi-port Ethernet switch using an integrated circuit and two power supplies, in accordance with some example embodiments.

FIG. 6 depicts an example of a circuit 600 for a multi-port Ethernet switch using one or more system-on-chip integrated circuits and two power supplies, in accordance with some example embodiments. The description of FIG. 6 also refers to FIGS. 1, 1A, 2-4A, 4B, and 5. The system-on-chip integrated circuit 620A may receive/transmit signals from/to cable 105F through physical interface 110A. Integrated circuit 620A may process the signals. For example, integrated circuit 620A may include the DC isolation capacitors 120A and/or a physical layer circuit 130A as described in the previous figures. Integrated circuit 620A may also include one or more filters, and/or termination resistors such as differential and DC termination resistors. Integrated circuit 620A may provide serial digital inputs/outputs as described in the previous figures. The serial digital outputs may pass through second multi-level isolation circuit 140 to upstream network processing 190. Upstream network processing 190 may include a MAC layer circuit as described in the previous figures.

In some example embodiments, system-on-chip integrated circuit 620A may include multiple physical layer circuits and DC isolation capacitors for multiple Ethernet channels associated with physical interfaces 110A-110C. In some example embodiments, circuit 600 may include multiple integrated circuits 620A-620C as described above.

Integrated circuit 620A may be powered by an isolated power supply 170A as described in the previous figures. Upstream network processing 190 may be powered by another power supply such as power supply 180. In some example embodiments multiple physical interfaces 110A, 110B, . . . , 602 may be referred to as physical interface block 610A and may connect to integrated circuit 620A. Integrated circuit 620A may contain multiple DC isolation circuits such as 102A-120E and multiple physical layer circuits such as 130A-130E. In some example embodiment, each physical interface block such as physical interface blocks 610A-610C in FIG. 6 may each connect to a different integrated circuit 620A-620C. In some example embodiments, the serial receive data streams and serial transmit data streams of integrated circuits 620A-620C may be combined together into a single receive data stream and a single transmit data stream as described above in the other figures. In some example embodiments, the combined transmit serial data stream may pass through a pair of capacitors in second multi-level isolation circuit 140 from upstream network processing 190, and combined receive serial data stream may pass through another pair of capacitors in second multi-level isolation circuit 140 to upstream network processing 190. Each capacitor isolation can be cascaded by a series of lower breakdown voltage capacitors, hence, the multi-level isolations. At each level of isolation, the isolation function can be transformers, capacitors, optoelectronic isolation devices, coupled magnetic devices, semiconductor devices, or any combination thereof.

Figure 7:
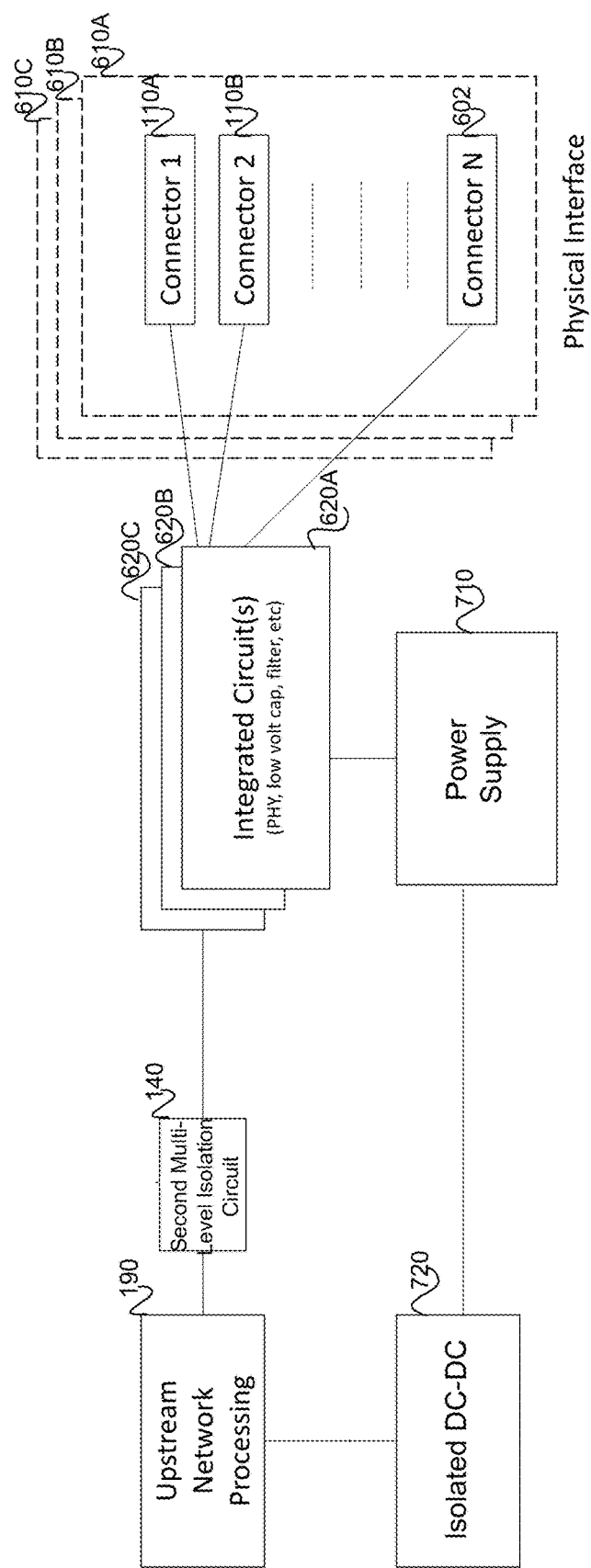
FIG. 7 depicts an example of a circuit for multi-port Ethernet switch using an integrated circuit, a power supply, and an isolated DC-DC converter, in accordance with some example embodiments.

FIG. 7 depicts an example of a circuit 700 for multi-port Ethernet switch using a system-on-chip integrated circuit, a power supply, and an isolated DC-DC converter, in accordance with some example embodiments. The description of FIG. 7 also refers to FIGS. 1, 1A, 2-4A, 4B, 5, and 6. FIG. 7 is similar to FIG. 6 except with a different power supply configuration. In FIG. 7, power supply 710 powers the integrated circuits 620A-620C and provides power to isolated DC-to-DC converter 720. Isolated DC-DC converter 720 powers the upstream network processing and other circuits common to the network device such as a switch/router controller and/or user interface, and so on. Power for the upstream processing and controller flows first through power supply 710 and then to isolated DC-DC converter 720 to provide the proper power to the upstream processing 190.

Figure 8:
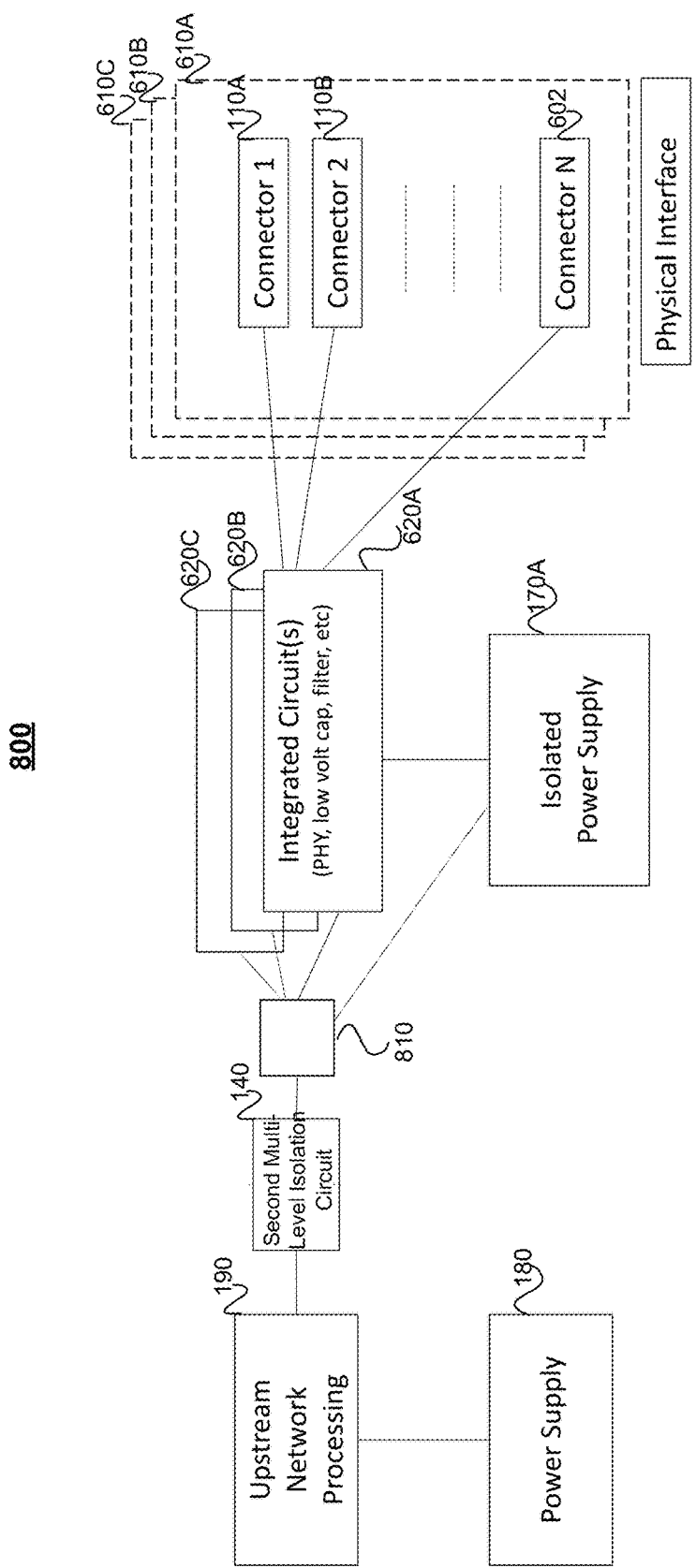
FIG. 8 depicts an example of a circuit for multi-port Ethernet switch using an integrated circuit and two power supplies, in accordance with some example embodiments.

FIG. 8 depicts an example of a circuit for multi-port Ethernet switch using a system-on-chip integrated circuit and two power supplies, in accordance with some example embodiments. The description of FIG. 8 also refers to FIGS. 1, 1A, 2-4A, 4B, 5, 6, and 7. FIG. 8 depicts integrated circuits 620A-620C that may include first multi-level isolation circuit 120A and/or a physical layer circuit 130A, one or more filters, and/or termination resistors as described with respect to FIG. 6. Circuit 810 may be placed between integrated circuits 620A-620C and second multi-level isolation circuit 140. Circuit 810 may include a circuit to combine together the serial data streams to/from integrated circuits 620A-620C. Circuit 810 may also contain other circuits as needed in the network systems. The power supply arrangement in FIG. 8 is similar to the power supply arrangement in FIG. 6 including two power supplies with isolated power supply 170A powering the circuits downstream of second multi-level isolation circuit 140 including circuit 810, and power supply 180 powering the circuits upstream of second multi-level isolation circuit 140.

Figure 9:
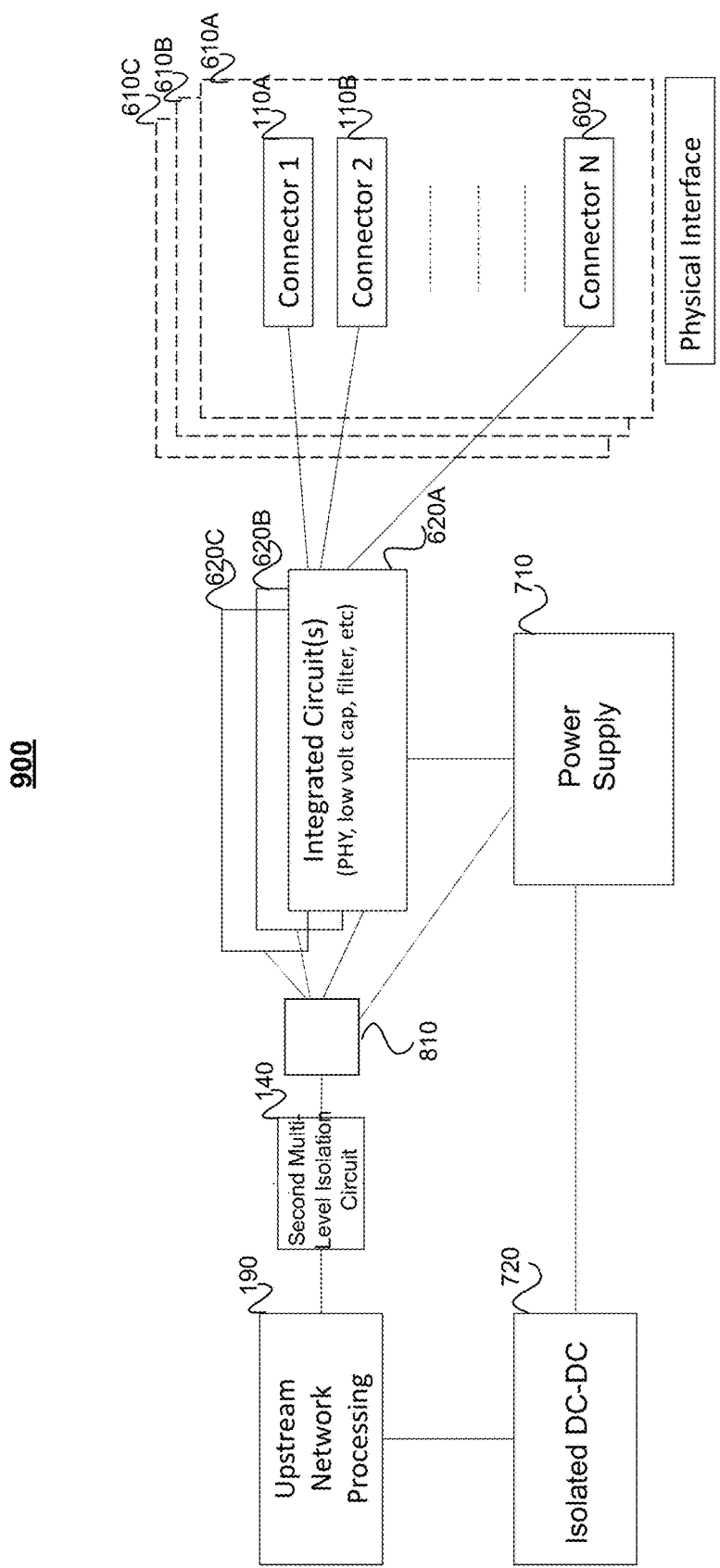
FIG. 9 depicts another example of a circuit for multi-port Ethernet switch using an integrated circuit, a power supply, and an isolated DC-DC converter, in accordance with some example embodiments.

FIG. 9 depicts another example of a circuit for multi-port Ethernet switch using a system-on-chip integrated circuit, a power supply, and an isolated DC-DC converter, in accordance with some example embodiments. The description of FIG. 9 also refers to FIGS. 1, 1A, 2-4A, 4B, 5, 6, 7, and 8. FIG. 9 depicts physical interface blocks 610A-610C, physical interfaces 110A-110B and 602, integrated circuits 620A-620C, circuit 810, second multi-level isolation circuit 140, and upstream network processing 190 as depicted in FIG. 8. The power supply arrangement in FIG. 9 is similar to the power supply arrangement in FIG. 7 where power supply 710 provides power to isolated DC-DC converter 720. Isolated DC-DC converter 720 isolates the circuits downstream of second multi-level isolation circuit 140 from the circuits upstream of second multi-level isolation circuit 140.

Figure 10:
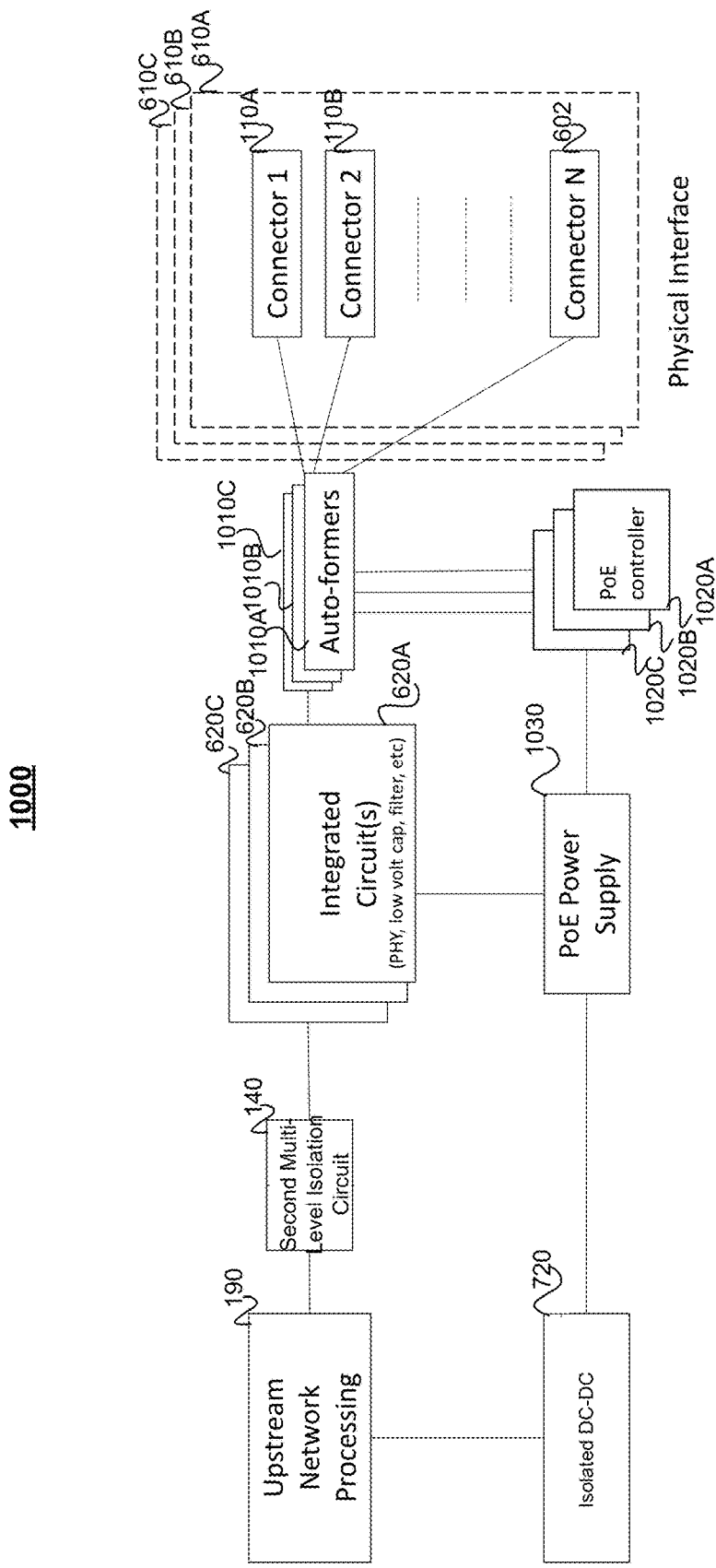
FIG. 10 depicts an example of a circuit for multi-port Ethernet switch with power over Ethernet using an integrated circuit, a power supply, and an isolated DC-DC converter, in accordance with some example embodiments.

FIG. 10 depicts an example of a circuit for multi-port Ethernet switch with power over Ethernet (PoE) using a system-on-chip integrated circuit, a power supply, and an isolated DC-DC converter, in accordance with some example embodiments. The description of FIG. 10 also refers to FIGS. 1, 1A, 2-4A, 4B, 5, 6, 7, 8, and 9. FIG. 10 depicts physical interface blocks 610A-610C, physical interfaces 110A-110B and 602, integrated circuits 620A-620C, second multi-level isolation circuit 140, and upstream network processing 190 as depicted in FIG. 8. Autoformers 1010A-1010C are inserted between physical interfaces 110A-110C and integrated circuits 620A-620C. Autoformers 1010A-1010C are describe above with respect to FIG. 4A at 410A-410D. The DC isolation capacitors in FIG. 4A are included in integrated circuits 620A-620C in FIG. 10. The centertaps of autoformers 1010A-1010C are driven by power over Ethernet controllers 1020A-1020C. Each power over Ethernet controller may perform as described at 410 in FIG. 4B. Power over Ethernet controllers 1020A-1020C may provide line sensing and load testing as described in the IEEE 802.3 specification noted above. Power is supplied by PoE power supply 1030 to the power over Ethernet controllers 1020A-1020C. PoE power supply 1030 may also provide power to the circuits downstream of second multi-level isolation circuit 140 such as integrated circuits 620A-620C. PoE power supply 1030 may also provide power to isolated DC-DC converter 720 which powers the circuits upstream of the second multi-level isolation circuit 140.

Figure 11:
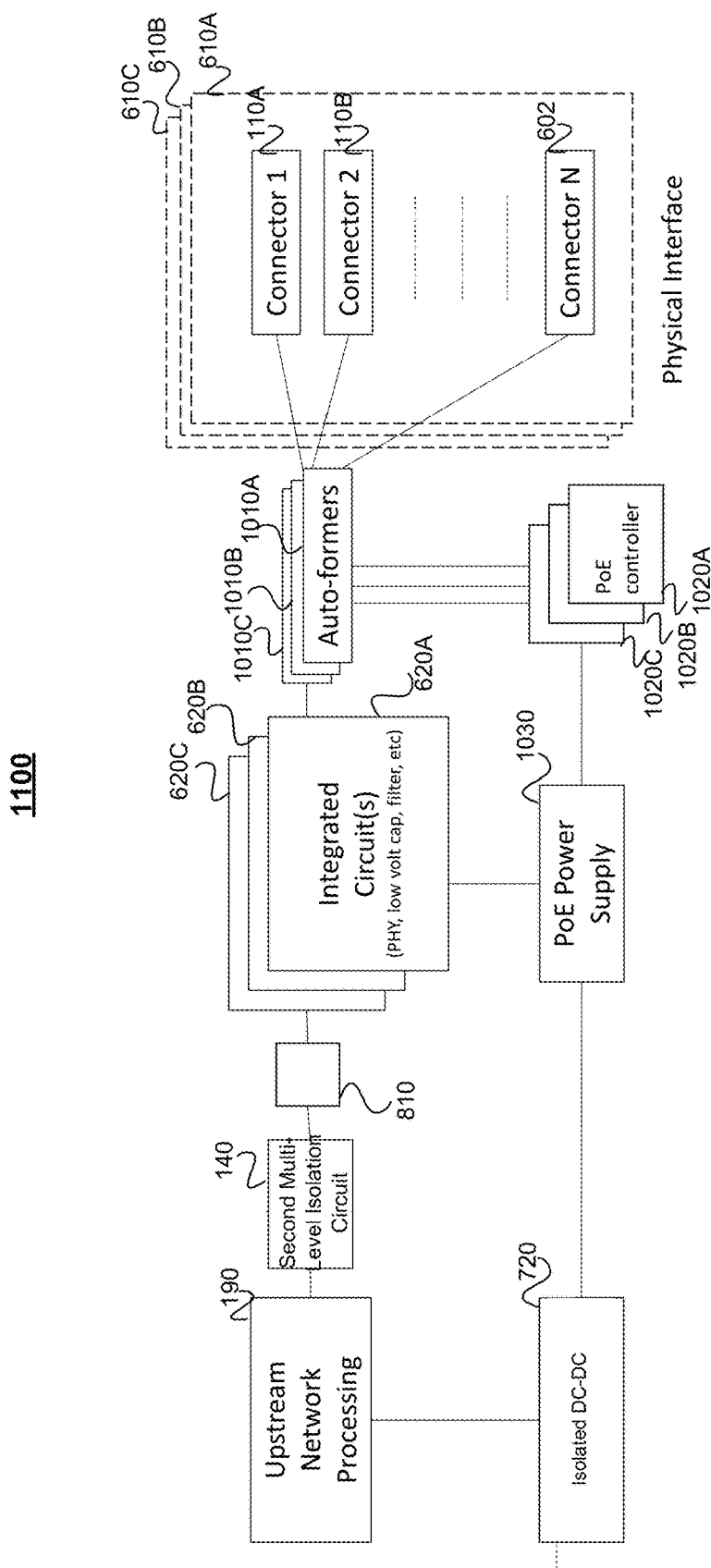
FIG. 11 depicts another example of a circuit for multi-port Ethernet switch with power over Ethernet using an integrated circuit, a power supply, and an isolated DC-DC converter, in accordance with some example embodiments.

FIG. 11 depicts another example of a circuit for multi-port Ethernet switch with power over Ethernet using a system-on-chip integrated circuit, a power supply, and an isolated DC-DC converter, in accordance with some example embodiments. The description of FIG. 11 also refers to FIGS. 1, 1A, 2-4A, 4B, 5, 6, 7, 8, 9, and 10. FIG. 11 depicts the PoE controllers 1020A-1020C, PoE power supply 1030, DC-DC converter 720, physical interface blocks 610A-610C, physical interfaces 110A-110B and 602, integrated circuits 620A-620C, second multi-level isolation circuit 140 and upstream network processing 190 as depicted in FIG. 10. FIG. 11 includes circuit 810 described with respect to FIG. 8 inserted between integrated circuits 620A-620C and upstream network processing 190.

Figure 12:
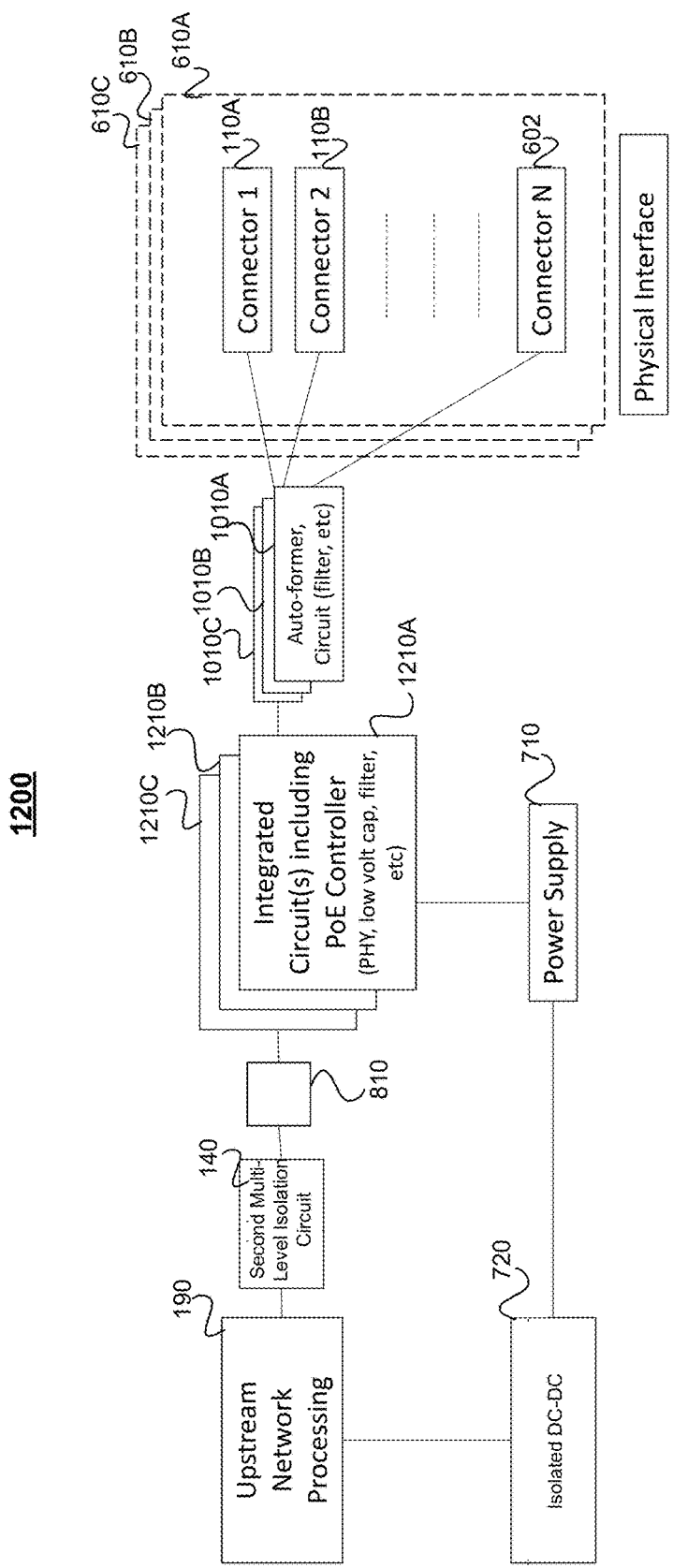
FIG. 12 depicts another example of a circuit for multi-port Ethernet switch with power over Ethernet using an integrated circuit, a power supply, and an isolated DC-DC converter, in accordance with some example embodiments.

FIG. 12 depicts another example of a circuit for multi-port Ethernet switch with power over Ethernet using a system-on-chip integrated circuit, a power supply, and an isolated DC-DC converter, in accordance with some example embodiments, in accordance with some example embodiments. The description of FIG. 12 also refers to FIGS. 1, 1A, 2-4A, 4B, 5, 6, 7, 8, 9, 10, and 11. FIG. 12 depicts DC-DC converter 720, circuit 810, physical interface blocks 610A-610C, physical interfaces 110A-110B and 602, second multi-level isolation circuit 140, and upstream network processing 190 as depicted in FIG. 11. FIG. 12 includes integrated circuits 1210A-1210C. Integrated circuits 1210A-1210C include the PoE controllers 1020A-1020C shown in FIG. 11. Power supply 710 may provide power to the circuits 1210A-1210C and circuit 810 that are downstream of second multi-level isolation circuit 140. Power supply 710 may provide PoE power to autoformers 1010A-1010C through the PoE controllers included in integrated circuits 1210A-1210C. Isolated DC-DC converter 720 may provide power to the circuits upstream of second multi-level isolation circuit 140. In some example embodiments, circuit 810 may include a direct connection between integrated circuits 1210A-1210C or 620A-620C and second multi-level isolation circuit 140.

The forgoing apparatuses, circuits, and methods provide many advantages. For example, a network apparatus may be produced using the disclosed subject matter including one or more isolation circuits to isolate the network (e.g., Ethernet) signals at the network apparatus from another network apparatus at the other end of a network cable. The isolation required by a networking standard such as Ethernet may be met using the disclosed first isolation circuit in combination with the disclosed second isolation circuit (or with a single isolation circuit). The disclosed DC and high-voltage isolation circuits minimize the number of high breakdown voltage devices by moving the high-voltage isolation to a high-speed serial interface upstream of the physical layer circuit in the network process. An isolated power supply powers the circuits downstream of the high-voltage isolation circuit to isolate the circuits upstream of the high voltage isolation circuit from the circuits downstream of the high-voltage isolation circuit. A PoE controller may be powered by the same isolated power supply as the circuits downstream of the high-voltage isolation circuit thereby not requiring an additional or separate isolated power supply for the power over Ethernet controller. Integrated circuits 620A-620C and/or 1210A-1210C may provide a single chip, or single system-on-chip solution to Ethernet network devices.

In some example embodiments, the disclosed apparatus may include an Ethernet physical interface, a first multi-level isolation circuit, a second multi-level isolation circuit, a physical layer circuit, and networking processing circuits. The first multi-level isolation circuit may isolate the Ethernet physical interface from the physical layer circuit. The second multi-level isolation circuit may isolate the physical layer from the networking process circuits. The first and/or second multi-level isolation may include one or more of the following: transformers, capacitors, optical isolators, radio frequency isolators, high speed digital isolators, or any combination thereof. A total isolation value may be represented by a sum of the isolation provided by the first isolation circuit and the second multi-level isolation circuit. The first multi-level isolation circuit may provide voltage isolation different in value than the second multi-level isolation circuit. In some example embodiments, one or more of the isolation circuits may provide zero volts of isolation.

One example method includes: receiving a first input; isolating, at a system-on-chip by a first isolation circuit, a direct current voltage at the first input from a first output; processing, at the system-on-chip by a physical layer circuit, the first output to produce a digital output; isolating the digital output from a second input via a second isolation circuit, wherein the second isolation circuit provides high-voltage isolation between the digital output and the second input; and processing, by an upstream network processing circuit, the isolated second input to produce a second output, wherein the upstream network processing circuit is powered by a first power supply isolated from a second power supply powering the physical layer circuit.

One example Ethernet network apparatus includes a physical interface connected to a network cable; a system-on-chip that includes a physical layer and network processing circuit with an associated second downstream interface and a second upstream interface; a first isolation circuit that includes a first downstream interface and a first upstream interface to isolate a direct current (DC) voltage between the physical interface and the physical layer and network processing circuit, wherein the first downstream interface is connected to the physical interface and the first upstream interface is connected to the second downstream interface; and a power over Ethernet circuit powered by a first power supply, wherein the first power supply is isolated from a second power supply by a DC-DC converter, and wherein the power over Ethernet circuit supplies power to an Ethernet device connected via a network cable to the apparatus; a second network processing circuit with an associated fourth downstream interface and a fourth upstream interface; and a second isolation circuit that includes a third downstream interface and a third upstream interface to provide high-voltage isolation between the physical layer and network processing circuit and the second network processing circuit, wherein the second upstream interface is connected to the third downstream interface and the third upstream interface is connected to the fourth downstream interface. The second upstream interface, the third downstream interface, the third upstream interface and the fourth downstream interface are digital interfaces, wherein the second network processing circuit is powered by the second power supply isolated from the first power supply powering the physical layer and network processing circuit.

An example apparatus includes a physical layer circuit structured to include a first input port and a first output port, the first input port structured to receive a first input signal, the physical layer circuit structured to process the first input signal to produce a first output signal at the first output port; an isolation circuit structured to include a second input port and a second output port, the second input port coupled to the first output port of the physical layer circuit to receive a first isolated voltage and a passed voltage, and structured to allow the passed voltage to pass through the isolation circuit to the second output port, the isolation circuit structured to isolate the first isolated voltage at the second input port from a second isolated voltage at the second output port; and a media access control (MAC) circuit structured to include a third input port and a third output port, the third input port coupled to the second output port of the isolation circuit to receive the passed voltage and the second isolated voltage, the MAC circuit structured to process the passed voltage to produce digital data, wherein the MAC is operable to determine the second isolated voltage without regard to the first isolated voltage, wherein the MAC circuit is powered by a first power supply isolated from a second power supply powering the physical layer circuit. In implementations, an isolated voltage is a DC voltage or AC voltage.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process 500 in FIG. 5).

Although a few variations have been described in detail above, other modifications or additions are possible. In particular, further features and/or variations may be provided in addition to the high speed data communication disclosed above. As depicted in FIG. 1A, there may be control signal and other lower speed buses needed between the isolated blocks. Using the method disclosed above (FPGA, CPLD, SOC etc.), the number of lower speed communication and control signal could be greatly reduced and simplified. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An Ethernet communication apparatus comprising:
   a physical interface that forms an input of the apparatus for receiving Ethernet signals and an output of the apparatus for outputting Ethernet signals;
   a physical layer circuit in communication with the physical interface to perform physical layer communication processing with respect to the transmitted or received Ethernet signals at the physical interface;
   a first isolation circuit coupled between the physical interface and the physical layer circuit to provide desired first electrical isolation therebetween;
   a network processing circuit in communication with the physical layer circuit to perform network processing operations in connection with the transmitted or received Ethernet signals at the physical interface; and
   a second isolation circuit coupled between the network processing circuit and the physical layer circuit to provide desired second electrical isolation therebetween and structured to include (1) one high-speed isolation circuit that carries a high-speed communication signal, to provide electrical isolation and (2) one low-speed isolation circuit that carries a low-speed communication signal or a control signal to provide electrical isolation.

2. The apparatus of claim 1, wherein the first or second isolation circuit includes a capacitor, an optoelectronic isolation device, a coupled magnetic device, or a semiconductor device.

3. The apparatus of claim 1, wherein first isolation circuit provides a voltage or current isolation, an electromagnetic interference isolation, common mode isolation, or signal integrity improvement in accordance with a communications standard.

4. The apparatus of claim 1, wherein the first isolation circuit or the second isolation circuit includes a combination two or more of: a capacitor, an optoelectronic isolation device, a coupled magnetic device, or a semiconductor device.

5. The apparatus of claim 1, wherein the first isolation circuit provides an isolation voltage, an electromagnetic interference isolation, common mode isolation, or signal integrity improvement in accordance with a communications standard.

6. The apparatus of claim 1, wherein the first isolation circuit and the second isolation circuit are structured to provide different isolation voltages.

7. The apparatus of claim 1, wherein the first isolation circuit and the physical layer circuit are integrated into a system-on-chip.

8. The apparatus of claim 1, wherein the first isolation circuit, the second isolation circuit, and the physical layer circuit are integrated into a system-on-chip.

9. The apparatus of claim 1, wherein the second isolation circuit is structured to provide another high-speed isolation circuit for high speed serial signals, another low-speed isolation circuit for low-speed signals, and a control isolation circuit for control signals, wherein the high-speed serial signals, the low-speed signals, and the control signals pass between the physical layer circuit and the network processing circuit.

10. The apparatus of claim 1, further comprising:
a first power supply;
   a power over Ethernet circuit coupled to and powered by the first power supply, wherein the power over Ethernet circuit is coupled to the physical interface to supply electrical power to an Ethernet device connected via a network cable to the physical interface of the apparatus; and
a second power supply coupled to supply power to the network processing circuit and electrically isolated from the first power supply.

11. The apparatus of claim 10, comprising:
a DC-DC converter coupled to electrically isolate the first and second power supplies.

12. The apparatus of claim 1, wherein:
the high-speed isolation circuit includes one or more capacitors to provide electrical isolation and to carry the high-speed communication signal.

13. The apparatus of claim 1, wherein:
the low-speed isolation circuit includes one or more transformers.

14. The apparatus of claim 1, wherein:
the low-speed isolation circuit includes one or more of a capacitor, an optoelectronic isolation device, a coupled magnetic device, or a semiconductor device.

15. The apparatus of claim 1, wherein:
the first or second isolation circuit includes separate isolation circuits electrically coupled in series to partition a desired electrical isolation amongst the separate isolation circuits so that an isolation circuit is structured to provide only a part of the desired electrical isolation.

16. The apparatus of claim 1, wherein:
the network processing circuit includes a media access control (MAC) layer circuit.

* * * * *

UNITED STATES PATENT AND TRADEMARK OFFICE
CERTIFICATE OF CORRECTION

| | |
|---|---|
| PATENT NO. | : 10,539,991 B2 |
| APPLICATION NO. | : 15/947062 |
| DATED | : January 21, 2020 |
| INVENTOR(S) | : Qin Zhang et al. |

It is certified that error appears in the above-identified patent and that said Letters Patent is hereby corrected as shown below:

In the Drawings

In Fig. 1A, Sheet 2 of 20, for Tag "141B", in Lines 2-3, delete "Communication Isolation" and insert -- Isolation --, therefor.

In Fig. 4B, Sheet 7 of 20, for Tag "160", in Line 1, delete "MAC" and insert -- MAC Layer Circuit --, therefor.

In Fig. 4B, Sheet 7 of 20, for Tag "170", in Lines 1-2, delete "First Isolated Power Supply" and insert -- Power Supply --, therefor.

In Fig. 5, Sheet 13 of 20, for Step "520", in Line 1, delete "input from" and insert -- input to produce --, therefor.

In Fig. 5, Sheet 13 of 20, for Step "550", in Line 3, delete "isolated form" and insert -- isolated from --, therefor.

In the Specification

In Column 2, Line 26, delete "circuit board (PCB)" and insert -- printed circuit board (PCB) --, therefor.

In Column 6, Line 16, delete "a Ethernet" and insert -- an Ethernet --, therefor.

In Column 6, Line 28, delete "example a power" and insert -- example of a power --, therefor.

In Column 6, Line 34, delete "example a power" and insert -- example of a power --, therefor.

In Column 11, Line 28, delete "MAC layer." and insert -- MAC layer --, therefor.

Signed and Sealed this
Twenty-eighth Day of February, 2023

Katherine Kelly Vidal
*Director of the United States Patent and Trademark Office*

CERTIFICATE OF CORRECTION (continued)
U.S. Pat. No. 10,539,991 B2

In Column 14, Line 56, delete "through 141." and insert -- through 141C. --, therefor.

In Column 17, Line 40, delete "circuit 300" and insert -- circuit 355 --, therefor.

In Column 17, Line 58, delete "A+. A-," and insert -- A+, A-, --, therefor.

In Column 18, Line 40, delete "multilevel" and insert -- multi-level --, therefor.

In Column 19, Line 20, delete "media access layer" and insert -- media access control --, therefor.

In Column 19, Line 37, delete "example power" and insert -- example of power --, therefor.

In Column 19, Line 54, delete "FIG. 4B-D" and insert -- FIGS. 4B-D --, therefor.

In Column 20, Line 12, delete "example a" and insert -- example of a --, therefor.

In Column 21, Lines 25-26, delete "circuits 120, 120A-120E, and/or 320" and insert -- circuits 130, 130A6-130E, and/or 330 --, therefor.

In Column 23, Line 11, delete "describe" and insert -- described --, therefor.

In the Claims

In Column 27, Line 4, in Claim 1, delete "circuit" and insert -- circuit, --, therefor.

In Column 27, Line 5, in Claim 1, delete "signal" and insert -- signal, --, therefor.